United States Patent
Abrams

(10) Patent No.: US 7,351,368 B2
(45) Date of Patent: *Apr. 1, 2008

(54) FLOCKED ARTICLES AND METHODS OF MAKING SAME

(75) Inventor: Louis Brown Abrams, Fort Collins, CO (US)

(73) Assignee: High Voltage Graphics, Inc., Fort Collins, CO (US)

( * ) Notice: Subject to any disclaimer, the term of this patent is extended or adjusted under 35 U.S.C. 154(b) by 136 days.

This patent is subject to a terminal disclaimer.

(21) Appl. No.: 10/614,399

(22) Filed: Jul. 3, 2003

(65) Prior Publication Data

US 2004/0081791 A1 Apr. 29, 2004

Related U.S. Application Data

(60) Provisional application No. 60/443,986, filed on Jan. 30, 2003, provisional application No. 60/432,952, filed on Dec. 11, 2002, provisional application No. 60/422,206, filed on Oct. 29, 2002, provisional application No. 60/416,098, filed on Oct. 4, 2002, provisional application No. 60/393,362, filed on Jul. 3, 2002.

(51) Int. Cl.
*B44C 1/16* (2006.01)
*B28B 19/00* (2006.01)
*B28B 23/00* (2006.01)
*B29C 65/70* (2006.01)
*B32B 33/00* (2006.01)
*B29C 51/00* (2006.01)

(52) U.S. Cl. ............ 264/241; 428/95; 428/97; 428/174; 428/90; 428/914; 264/255; 264/250; 264/239; 156/241; 156/230

(58) Field of Classification Search ............... 156/196, 156/221, 276, 241, 230; 427/462; 428/90, 428/95, 97, 174, 914; 264/255, 241, 250, 264/239
See application file for complete search history.

(56) References Cited

U.S. PATENT DOCUMENTS

| | | | |
|---|---|---|---|
| 1,905,989 A | 4/1933 | Safir et al. | |
| 1,905,999 A | 4/1933 | Ellis | |
| 2,592,602 A | 4/1952 | Saks | |
| 2,636,837 A | 4/1953 | Summers | 154/123 |
| 2,999,763 A | 9/1961 | Sommer | |
| 3,215,584 A | 11/1965 | McConnell et al. | |
| 3,314,845 A | 4/1967 | Perri | |

(Continued)

FOREIGN PATENT DOCUMENTS

AT     E 93 557     8/1988

(Continued)

OTHER PUBLICATIONS

"Agion Antimicrobial: The Most Advanced Antimicrobial Silver Delivery System" (an introduction); *Agion Technologies, LLC*, date unknown.

(Continued)

*Primary Examiner*—Cheryl Juska
(74) *Attorney, Agent, or Firm*—Sheridan Ross P.C.

(57) ABSTRACT

A method of manufacturing a molded article using lamination of a flocked surface onto a backing film is provided. Also provided is a flocked article comprising an antimicrobial agent.

27 Claims, 8 Drawing Sheets

U.S. PATENT DOCUMENTS

| | | | |
|---|---|---|---|
| 3,377,232 A | 4/1968 | Mencock et al. | |
| 3,459,579 A | 8/1969 | Newman | |
| 3,496,054 A | 2/1970 | Baigas | |
| 3,529,986 A | 9/1970 | Kappas et al. | 117/17 |
| 3,565,742 A | 2/1971 | Stephens et al. | |
| 3,622,434 A | 11/1971 | Newman | |
| 3,639,149 A | 2/1972 | Spalding | |
| 3,657,060 A | 4/1972 | Haigh | 161/73 |
| 3,660,200 A | 5/1972 | Anderson et al. | |
| 3,674,611 A | 7/1972 | Petry et al. | |
| 3,772,132 A | 11/1973 | Dulin, Jr. | |
| 3,775,205 A | 11/1973 | Hermann et al. | 156/72 |
| 3,793,050 A | 2/1974 | Mumpower, Jr. | 117/17.5 |
| 3,803,453 A | 4/1974 | Hull | |
| 3,816,060 A | 6/1974 | Koskolos | |
| 3,816,211 A | 6/1974 | Haigh | 156/309 |
| 3,837,946 A | 9/1974 | Gribbin | |
| 3,900,676 A | 8/1975 | Alderson | |
| 3,903,331 A | 9/1975 | Klein | |
| 3,936,554 A | 2/1976 | Squier | |
| 3,956,552 A | 5/1976 | Geary | 428/88 |
| 3,969,559 A | 7/1976 | Boe | |
| 3,979,538 A | 9/1976 | Gilman et al. | |
| 3,989,869 A | 11/1976 | Neumaier et al. | 428/254 |
| 4,018,956 A | 4/1977 | Casey | 428/86 |
| 4,025,678 A | 5/1977 | Frank | |
| 4,031,281 A | 6/1977 | Keeling | |
| 4,034,134 A | 7/1977 | Gregorian et al. | 428/86 |
| 4,035,532 A | 7/1977 | Gregorian et al. | 428/90 |
| 4,062,992 A | 12/1977 | Power et al. | |
| 4,088,708 A | 5/1978 | Riew | |
| 4,102,562 A | 7/1978 | Harper et al. | 350/105 |
| 4,142,929 A | 3/1979 | Otomine et al. | 156/72 |
| 4,160,851 A | 7/1979 | Lienert et al. | 427/379 |
| 4,201,810 A | 5/1980 | Higashiguchi | 428/90 |
| 4,218,501 A | 8/1980 | Kameya et al. | |
| 4,269,885 A | 5/1981 | Mahn | 428/216 |
| 4,273,817 A | 6/1981 | Matsuo et al. | 428/90 |
| 4,282,278 A | 8/1981 | Higashiguchi | 428/90 |
| 4,292,100 A | 9/1981 | Higashiguchi | 156/72 |
| 4,308,296 A | 12/1981 | Chitouras | |
| 4,314,813 A | 2/1982 | Masaki | 8/468 |
| 4,314,955 A | 2/1982 | Boden et al. | 264/51 |
| 4,340,623 A | 7/1982 | Justus | |
| 4,340,632 A | 7/1982 | Wells et al. | |
| 4,352,924 A | 10/1982 | Wooten et al. | |
| 4,369,157 A | 1/1983 | Conner | 264/246 |
| 4,385,588 A | 5/1983 | Bennetot | 118/638 |
| 4,388,134 A | 6/1983 | Long et al. | |
| 4,390,387 A | 6/1983 | Mahn | |
| 4,396,662 A | 8/1983 | Higashiguchi | 128/90 |
| 4,405,401 A | 9/1983 | Stahl | 156/248 |
| 4,418,106 A | 11/1983 | Landler et al. | |
| 4,423,106 A | 12/1983 | Mahn | 428/207 |
| 4,430,372 A | 2/1984 | Knoke et al. | |
| 4,465,723 A | 8/1984 | Knoke et al. | |
| 4,539,166 A | 9/1985 | Richartz et al. | 264/45.1 |
| 4,574,018 A | 3/1986 | Masuda et al. | 156/72 |
| 4,582,658 A | 4/1986 | Reichmann et al. | 264/45.1 |
| 4,652,478 A | 3/1987 | Maii | 428/43 |
| 4,668,323 A | 5/1987 | Lenards et al. | 156/242 |
| 4,670,089 A | 6/1987 | Hanson | |
| 4,681,791 A | 7/1987 | Shibahashi et al. | 428/96 |
| 4,687,527 A | 8/1987 | Higashiguchi | 156/72 |
| 4,741,791 A | 5/1988 | Howard et al. | 156/72 |
| 4,790,306 A | 12/1988 | Braun et al. | 128/206.12 |
| 4,793,884 A | 12/1988 | Horikiri | |
| 4,797,320 A | 1/1989 | Kopp et al. | 428/316.6 |
| 4,810,321 A | 3/1989 | Wank et al. | 156/244.23 |
| 4,810,549 A | 3/1989 | Abrams et al. | 428/88 |
| 4,812,247 A | 3/1989 | Fahner et al. | 252/511 |
| RE33,032 E | 8/1989 | Binsack et al. | |
| 4,906,464 A | 3/1990 | Yamamoto et al. | 424/489 |
| 4,938,955 A | 7/1990 | Niira et al. | 424/78.1 |
| 4,938,958 A | 7/1990 | Niira et al. | 424/78.1 |
| 4,966,801 A | 10/1990 | Becker et al. | |
| 4,972,015 A | 11/1990 | Carico et al. | |
| 4,980,216 A | 12/1990 | Römpp | 428/90 |
| 5,008,130 A | 4/1991 | Lenards | 427/206 |
| 5,009,950 A | 4/1991 | Wagner et al. | |
| 5,026,591 A | 6/1991 | Henn et al. | 428/198 |
| 5,041,104 A | 8/1991 | Seal | 604/367 |
| 5,043,375 A | 8/1991 | Henning et al. | 524/372 |
| 5,047,103 A | 9/1991 | Abrams et al. | 156/72 |
| 5,053,179 A | 10/1991 | Masui et al. | 264/257 |
| 5,077,116 A | 12/1991 | Lefkowitz | |
| 5,104,723 A | 4/1992 | Freitag et al. | |
| 5,108,530 A | 4/1992 | Niebling, Jr. et al. | 156/245 |
| 5,112,423 A | 5/1992 | Liebe, Jr. | |
| 5,115,104 A | 5/1992 | Bunyan | |
| 5,154,871 A | 10/1992 | Wagner et al. | 264/255 |
| 5,198,277 A | 3/1993 | Hamilton et al. | 428/92 |
| 5,207,851 A | 5/1993 | Abrams | 156/230 |
| 5,217,563 A | 6/1993 | Niebling et al. | 156/382 |
| 5,217,781 A | 6/1993 | Kuipers | |
| 5,248,536 A | 9/1993 | Du Katz | |
| 5,274,039 A | 12/1993 | Sirinyan et al. | |
| 5,306,567 A | 4/1994 | Kuo et al. | |
| 5,346,746 A | 9/1994 | Abrams | 428/195 |
| 5,350,474 A | 9/1994 | Yamane | 156/240 |
| 5,350,830 A | 9/1994 | Kuo et al. | |
| 5,358,789 A | 10/1994 | Kuo et al. | |
| 5,383,996 A | 1/1995 | Dressler | |
| 5,489,359 A | 2/1996 | Yamane | 156/540 |
| 5,503,179 A | 4/1996 | Till | |
| 5,529,650 A | 6/1996 | Bowers et al. | |
| 5,534,099 A | 7/1996 | Yamamoto | 156/230 |
| 5,556,669 A | 9/1996 | Sasaki et al. | 427/410 |
| 5,564,249 A | 10/1996 | Borys et al. | |
| 5,597,637 A | 1/1997 | Abrams et al. | 428/90 |
| 5,622,587 A | 4/1997 | Barthelman | 156/251 |
| 5,654,395 A | 8/1997 | Jackson, Jr. et al. | 528/308.3 |
| 5,693,400 A | 12/1997 | Hamilton et al. | 428/89 |
| 5,762,379 A | 6/1998 | Salmon et al. | 283/91 |
| 5,766,397 A | 6/1998 | Jones | 156/230 |
| 5,804,007 A | 9/1998 | Asano | 156/72 |
| 5,858,156 A | 1/1999 | Abrams et al. | 156/230 |
| 5,900,096 A | 5/1999 | Zemel | 156/233 |
| 5,909,021 A | 6/1999 | Duffy | 200/514 |
| 5,912,065 A | 6/1999 | Kukoff | 428/195 |
| 5,922,436 A | 7/1999 | Banfield et al. | 428/100 |
| 5,981,009 A | 11/1999 | Iacono et al. | |
| 6,010,764 A | 1/2000 | Abrams | 428/90 |
| 6,083,332 A | 7/2000 | Abrams | 156/72 |
| 6,102,686 A | 8/2000 | Eschenfelder | 425/388 |
| 6,110,560 A | 8/2000 | Abrams | 428/90 |
| 6,113,149 A | 9/2000 | Dukatz | 283/91 |
| 6,146,485 A | 11/2000 | Iacono et al. | 156/230 |
| 6,170,881 B1 | 1/2001 | Salmon et al. | |
| 6,171,678 B1 | 1/2001 | Holeschovsky et al. | 428/97 |
| 6,202,549 B1 | 3/2001 | Mitsam et al. | 101/27 |
| 6,224,707 B1 | 5/2001 | Lion | 156/230 |
| 6,249,297 B1 | 6/2001 | Lion | 347/171 |
| 6,257,866 B1 | 7/2001 | Fritz et al. | 425/387.1 |
| 6,264,775 B1 | 7/2001 | Holeschovsky et al. | 156/72 |
| 6,277,312 B1 | 8/2001 | Hansen et al. | 264/132 |
| 6,296,908 B1 | 10/2001 | Reihs et al. | 427/393.5 |
| 6,299,715 B1 | 10/2001 | Langsdorf et al. | 156/72 |
| 6,387,472 B1 | 5/2002 | Reck et al. | 428/195 |
| 6,428,877 B1 | 8/2002 | Suss et al. | 428/195 |
| 6,436,506 B1 | 8/2002 | Pinter et al. | |
| 6,451,148 B1 | 9/2002 | Jenner | 156/230 |
| 6,569,538 B1 | 5/2003 | Kaschel | |
| 6,577,657 B1 | 6/2003 | Elschner et al. | |

| | | | |
|---|---|---|---|
| 6,630,216 B2 | 10/2003 | Pophusen et al. | |
| 6,646,022 B2 * | 11/2003 | Okazaki et al. | 522/153 |
| 6,676,796 B2 | 1/2004 | Pinter et al. | |
| 6,783,184 B2 | 8/2004 | DiBattista et al. | |
| 6,787,589 B2 | 9/2004 | Weaver et al. | |
| 2001/0008672 A1 | 7/2001 | Norvell et al. | |
| 2003/0129353 A1 | 7/2003 | Abrams | |
| 2003/0203152 A1 | 10/2003 | Higgins et al. | 428/92 |
| 2004/0081791 A1 | 4/2004 | Abrams | |
| 2004/0170799 A1 | 9/2004 | Carr et al. | |
| 2005/0081985 A1 | 4/2005 | Abrams | |
| 2005/0158508 A1 | 7/2005 | Abrams | |
| 2005/0196594 A1 | 9/2005 | O'Rell et al. | |
| 2005/0266204 A1 | 12/2005 | Abrams | |
| 2005/0268407 A1 | 12/2005 | Abrams | |
| 2006/0026778 A1 | 2/2006 | Lion | |
| 2006/0029767 A1 | 2/2006 | Lion | |
| 2006/0251852 A1 | 11/2006 | Abrams | |
| 2007/0003761 A1 | 1/2007 | Miyazono et al. | |
| 2007/0022548 A1 | 2/2007 | Abrams | |
| 2007/0026189 A1 | 2/2007 | Abrams | |

FOREIGN PATENT DOCUMENTS

| | | | |
|---|---|---|---|
| AU | 606651 | 2/1991 | |
| AU | 653994 | 10/1994 | |
| CA | 757595 | 4/1967 | 156/72 |
| CA | 2010076 | 8/1990 | |
| CA | 1306411 | 8/1992 | |
| CA | 2064300 | 9/1992 | |
| DE | 3883517 | 5/1994 | |
| DE | 19734316 A1 | 2/1999 | |
| EP | 0122656 | 10/1984 | |
| EP | 0210304 A1 | 2/1987 | |
| EP | 0280296 A2 | 8/1988 | |
| EP | 0351079 A3 | 1/1990 | |
| EP | 0506601 | 9/1992 | |
| EP | 0685014 B1 | 6/1997 | |
| EP | 0913271 | 10/1998 | |
| EP | 0989227 A2 | 3/2000 | |
| FR | 2543984 | 10/1984 | |
| FR | 2659094 | 9/1991 | |
| FR | 2784619 A1 | 10/1998 | |
| FR | 2846202 | 4/2004 | |
| GB | 1171296 | 11/1969 | |
| GB | 1447049 | 12/1972 | |
| GB | 1466271 | 12/1973 | |
| GB | 2065031 A | 12/1979 | |
| GB | 2126951 A | 9/1983 | |
| GB | 2214869 | 9/1989 | |
| IE | 55104 | 4/1984 | |
| IT | 0329767 | 8/1993 | |
| JP | 55079143 | 6/1980 | |
| JP | 56058824 | 5/1981 | |
| JP | 356058824 A | 5/1981 | |
| JP | 56107080 | 8/1981 | |
| JP | 56108565 | 8/1981 | |
| JP | 56141877 A2 | 11/1981 | |
| JP | 358062027 A | 4/1983 | |
| JP | 59106944 | 6/1984 | |
| JP | 359115885 A | 7/1984 | |
| JP | 60-171138 | 9/1985 | |
| JP | 60-236738 | 11/1985 | |
| JP | 363118544 A | 5/1988 | |
| JP | 64-61299 | 3/1989 | |
| JP | 5-201196 | 8/1993 | |
| JP | 405255021 A | 10/1993 | |
| JP | 410059790 A | 3/1998 | |
| JP | 11277662 | 10/1999 | |
| JP | 11348159 | 12/1999 | |
| JP | 02000084977 A | 3/2000 | |
| JP | 2001270019 | 10/2001 | |
| KR | 220373 | 9/1999 | |
| KR | 2003063833 | 7/2003 | |
| NO | 306099 | 6/1989 | |
| TW | 62640 | 7/1993 | |
| WO | WO 79/01146 | 12/1979 | |
| WO | WO 89/01829 | 3/1989 | |
| WO | WO 90/09289 | 8/1990 | |
| WO | WO 94/19530 | 9/1994 | |
| WO | WO 02/07959 | 1/2002 | |
| WO | WO 02/07959 A1 | 1/2002 | |
| WO | WO 02/09925 A1 | 2/2002 | |
| WO | WO 02/058854 A1 | 12/2002 | |
| WO | WO 03/031083 A1 | 4/2003 | |
| WO | WO 2004/005023 | 1/2004 | |
| WO | WO 2004/005600 | 1/2004 | |
| ZA | 88/6259 | 4/1990 | |
| ZA | 92/2154 | 2/1993 | |

OTHER PUBLICATIONS

"AK Coatings—Applications" page; *AK Coatings*; before Nov. 1, 2002; www.akcoatings.com/applications/default.asp.

"AK Coatings—Growing Demand" page; *AK Coatings*; before Nov. 1, 2002; www.akcoatings.com/growing_demand/default.asp.

"AK Coatings—Home" page; *AK Coatings*; before Nov. 1, 2002; www.akcoatings.com.

"AK Coatings—How It Works" page; *AK Coatings*; before Nov. 1, 2002; www.akcoatings.com/how_it_works/default.asp.

"AK Coatings—Specify and Purchase" page; *AK Coatings*; before Nov. 1, 2002; www.akcoatings.com/specifiy_purchase/default.asp.

"Automotive & Industrial Division: Web & Powder Adhesives"; *Bostik USA*; 2000; 2 pgs.

"Surfaces: Clean Home Dream Home"; *AK Coatings*; 2002; vol. 1, Issue 1.

U.S. Appl. No. 09/621,830, filed Jul. 24, 2000, Abrams.
U.S. Appl. No. 09/629,746, filed Jul. 31, 2000, Abrams.
U.S. Appl. No. 09/735,721, filed Dec. 13, 2000, Abrams.
U.S. Appl. No. 10/265,206, filed Oct. 4, 2002, Abrams.
U.S. Appl. No. 10/394,357, filed Mar. 21, 2003, Abrams.
U.S. Appl. No. 10/455,541, filed Jun. 4, 2003, Abrams.
U.S. Appl. No. 10/455,575, filed Jun. 4, 2003, Abrams.
U.S. Appl. No. 10/613,981, filed Jul. 3, 2003, Abrams.
U.S. Appl. No. 10/613,982, filed Jul. 3, 2003, Abrams.
U.S. Appl. No. 10/614,340, filed Jul. 3, 2003, Abrams.
U.S. Appl. No. 10/670,091, filed Sep. 23, 2003, Abrams.

Abrams, Brown, "Flocking A Touch of Velour" *ScreenPrinting* (Apr. 1987).

Abrams, Brown, "Part II: Flocking" *ScreenPrinting* (Jun. 1987).

AgION™ Antimicrobial Production Informaiton Bulletin, undated, 2 pages.

AgION™ Technologies Press Release "AgION™ Technologies customer Mile High Equipment Awarded "American Culinary Award of Excellence" for Ice-O-Matic® ice machines containing AgION™ antimicrobial" (Jan. 7, 2002), 1 page.

AK Steel Press Release "AK Steel's AgION™ Antimicrobial-Coated Steels Named One of the "*Best of What's New*" by *Popular Science* Magazine Bacteria Resistant Steels Win Distinguished Award in Home Technology Category" (Nov. 13), 2 pages.

Bayer Plastics Division Press Release, "Wheel Covers, Center Caps Become Revolving Art Forms with New Film Insert Molding Technology" (Jun. 19, 2000), 4 pages.

Bostik Findley USA; "Industrial Adhesives" (2001), 3 pages.

"Cutting-Edge Germ Weapon from Ancient World" KM Communications (May 10, 2003), available at http://www.newswise.com/articles/2003/5/ANTMCRBL.KMC.html, 2 pages.

Declaration of L. Brown Abrams under 37 CFR §1.132, dated Jan. 7, 2003.

Defosse, Matthew, "Systems Approach Gives Blow Molders Big Edge," www.modplas.com (Dec. 2000).

Eastman, "Need? A Polyester Fiber with these attributes . . . " (undated), 11 pages.

Eastman PCT Polyester, "New Resins, New Services" (undated), 5 pages.

GE Structured Products, "Lexan® In-Mold Films: A Guide for Designing, Forming and Molding with Screenprinted Lexan® Films" (undated), pp. 1-20.

Griffin, Patrick J., "Film Insert Molding," *SGIA Journal*, First Quarter 2001, pp. 31-36.

Landwehr, Rebecca, "When is a mouse pad really a rug?" *The Denver Business Journal* (Nov. 1998), at http://denver.bizjournals.com/denver/stories/1998/11/30/story3.html.

Lextra® MouseRug®; "About the Product" (Jan. 27, 1999), http://www.mouserug.com/mouserug/aboutmouserugs.html, 2 pages.

Lextra® MouseRug®; "MouseRug Components" (Jan. 27, 1999), http://www.mouserug.com/mouserug/mousecomp.html, 1 page.

Lextra® MouseRug®; "Dimensions" (Jan. 27, 1999), http://www.mouserug.com/mouserug/dimensions.html, 1 page.

Lou Reade Reports "Surface Attention" *European Plastics News* (May 2003), p. 26.

"Magic Carpet," *Wired* (Nov. 1998), p. 68.

Paladin Capital Group Press Release "America's Homeland Security Enhanced by Paladin Capital's $10.5 Million Investment by AgION Technologies' War Against Bacteria" (Jan. 28, 2003), 2 pages.

Peterson, Jeff, "New Innovations in 3D Curved Parts Decorating," *Plastics Decorating* (Oct.-Nov. 2001), available at http://www.petersonpublications.com/plasticsdecorating/articlesdisplay.asp?ID=17, 3 pages.

Shaner, Ken, "Advanced Molding Processes: Low Pressure Molding/Low-High Pressure Molding for Interior Trim," Automotive & Transportation Interior Expo Conference 1997, Session 9, pp. 1-2.

Snyder, Merle R., "Fabric Molding Shows Promise in Automotive: Machine Makers Offer Innovative Systems That Boost Productivity and Facilitate Recyclability," *Modern Plastics* (Oct. 1999), available at http://www.modplas.com/new/month_1099/ms10.htm.

Sonics & Materials, Inc., "Chart II Compatability of Thermoplastics" (undated), 1 page.

Takatori, Hiroyuki, "Dieprest In-mold Laminate Technology," Automotive & Transportation Interiors Expo Conference 1999, Session 12, pp. 1-4.

Declaration of L. Brown Abrams under 37 CFR § 1.98 for U.S. Appl. No. 10/394,357 dated Jan. 16, 2004, 4 pages with Appendix A-I.

Declaration of L. Brown Abrams under 37 CFR § 1.98 for U.S. Appl. No. 09/621,830 dated Jan. 16, 2004, 2 pages.

"Corterra Polymers," (printed Mar. 8, 2004) http://www.swicofil.com/ptt.html, 4 pages.

"Hettinga: Plastics Technology for the Future, Available Today!" website (circa 2000), 4 pages.

USPTO Office Action for U.S. Appl. No. 10/613,982, filed Jul. 3, 2003, dated Oct. 6, 2005, 21 pages.

U.S. Appl. No. 29/058,551, filed Aug. 19, 1996, Abrams.
U.S. Appl. No. 09/548,839, filed Apr. 13, 2000, Abrams.
U.S. Appl. No. 11/460,493, filed Jul. 27, 2006, Abrams.
U.S. Appl. No. 11/533,699, filed Sep. 20, 2006, Abrams.
U.S. Appl. No. 11/560,679, filed Nov. 16, 2006, Abrams.
U.S. Appl. No. 11/565,974, filed Dec. 1, 2006, Abrams.

"Characteristics of Commonly Used Elastomers" avaliable at http://www.deerfieldurethane.com/Deerfield-Urethane_Brochure.pdf, date unknown, 4 pages.

"Door Panels Collano overcomes strain forces"; Collano AG, Switzerland, Oct. 2004; 1 page.

"Flockin' to Precision"; Images Magazine; Feb. 1992, 1 page.

"Schaetti Fix Cross Linking Test Product"; Dynamic Coating Technology; Sep. 18, 2006; 4 pages.

Bostik USA; "Automotive & Industrial Division: Web & Powder Adhesives" (2002), available at http://www.bostik.com/oem/web_adhesives.html, 2 pages.

Cellusuede Products, Inc, "About Flock", Available at http://www.cellusuede.com/navabout.html, KMK Media Group, copyright 2000, 1 pages.

Cellusuede Products, Inc, "FAQ's", Available at http://www.cellusuede.com/faq.html, KMK Media Group, copyright 2000, 2 pages.

Cellusuede Products, Inc, "Fiber Types", Available at http://www.cellusuede.com/about/types.html, KMK Media Group, copyright 2000, 4 pages.

Cellusuede Products, Inc, "Glossary of Terms", Available at http://www.cellusuede.com/glossary/index.html, KMK Media Group, copyright 2000, 2 pages.

Cellusuede Products, Inc, "Uses for Flock, Home Furnishings", Available at http://www.cellusuede.com/home.html, KMK Media Group, copyright 2000, 2 pages.

Mark Matsco, Patrick Griffin, Film Insert Molding Technology, 1997.

Declaration of L. Brown Abrams Under 37 CFR § 1.98 for U.S. Appl. No. 09/735,721 dated Jan. 16, 2004, 2 pages.

Declaration of L. Brown Abrams under 37 CFR § 1.98 for U.S. Appl. No. 09/621,830 dated Jan. 7, 2003, 2 pages.

Declaration of L. Brown Abrams under 37 CFR § 1.98 for U.S. Appl. No. 10/394,357 dated Jan. 3, 2007, 4 pages with Appendix A-I.

Second Supplemental Declaration of L. Brown Abrams under 37 CFR §1.132 for U.S. Appl. No. 09/548,839 executed Jan. 7, 2003.

Supplemental Declaration of L. Brown Abrams under 37 CFR § 1.132 for U.S. Appl. No. 09/548,839 executed Oct. 23, 2002.

DuPont Thermx PCT Product and Properties Guide brochure dated Aug. 2003.

"Bicomponent Fibers", available at http://web.utk.edu/~mse/pages/Textiles/Bicomponent%20fibers.htm, Updated Apr. 2004, 8 pages.

PCT Written Opinion, mailed Sep. 11, 2002, in PCT application PCT/US01/23278.

PCT International Search Report, mailed Nov. 19, 2001, in PCT application PCT/US01/23278.

PCT International Search Report, mailed Dec. 19, 2002, in PCT application PCT/US01/23278.

Office Action, mailed Jun. 15, 2005, in Australian Patent Application No. 2001277991.

Office Action, mailed Nov. 18, 2005, in U.S. Appl. No. 10/394,357.

Office Action for Chinese Application No. 01815554.5 (with English translation), Jan. 4, 2006.

* cited by examiner

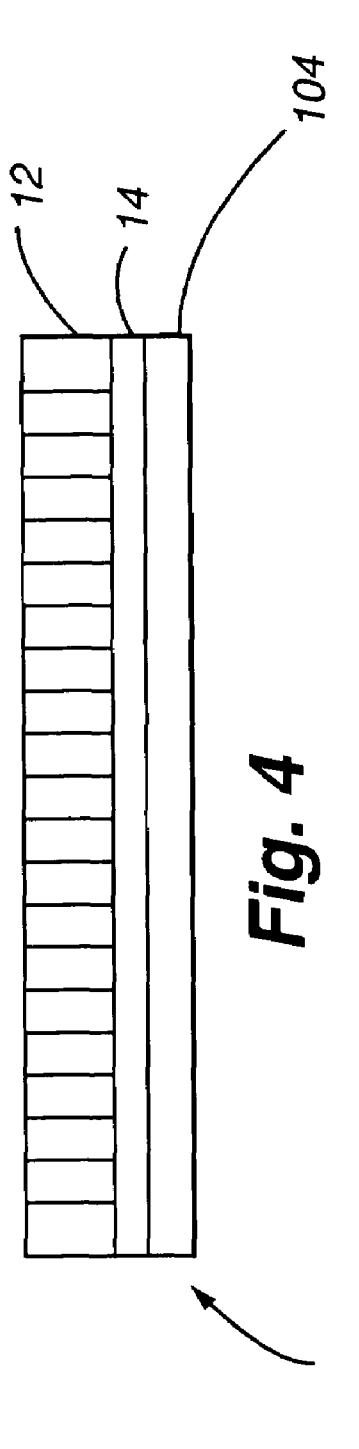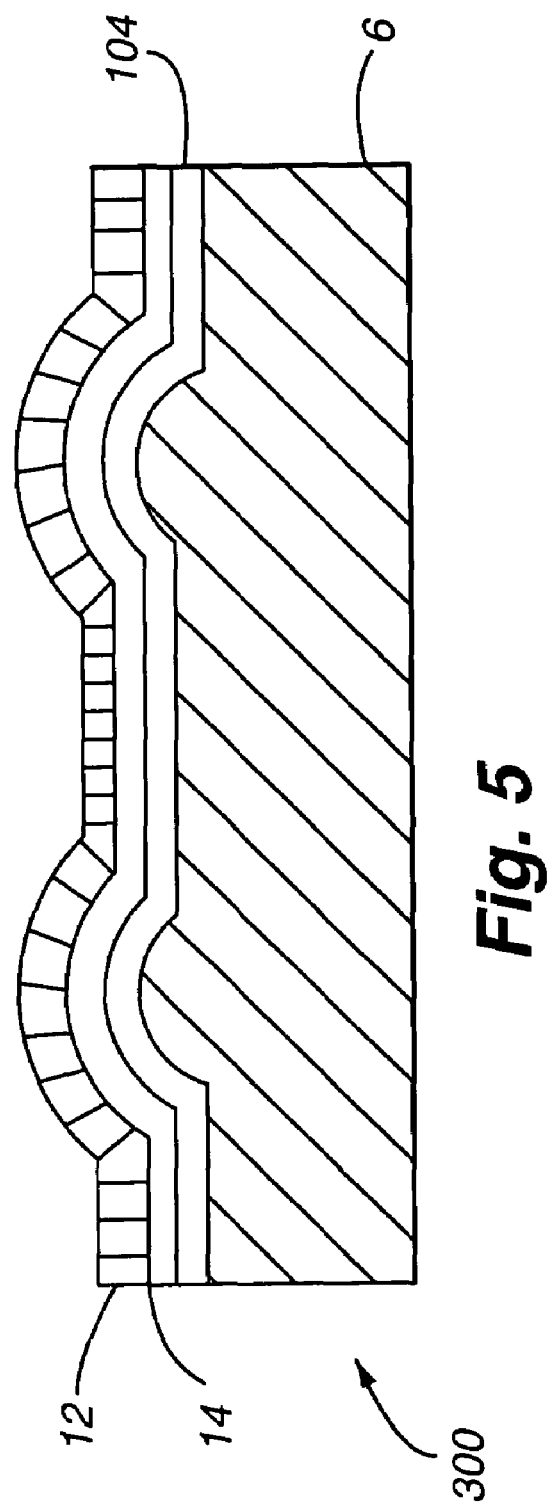

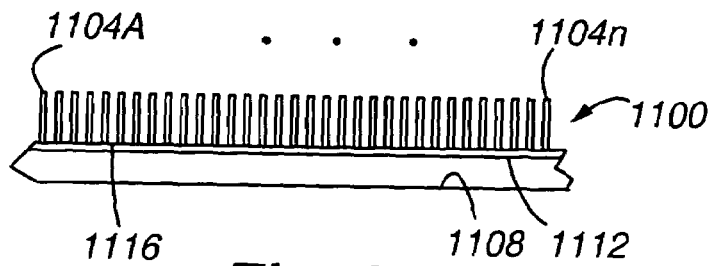
Fig. 12
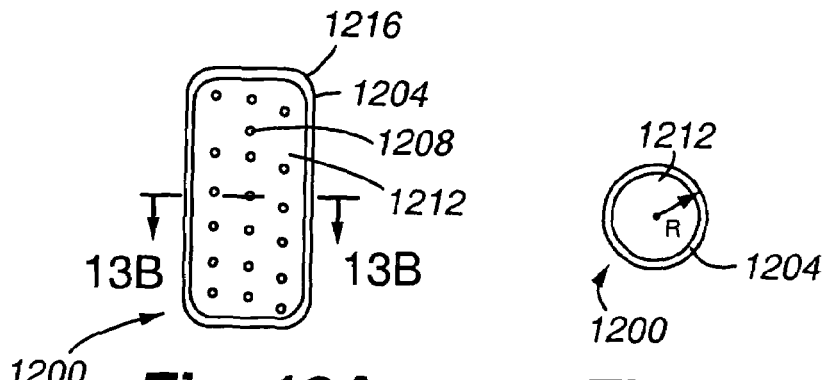
Fig. 13A  Fig. 13B
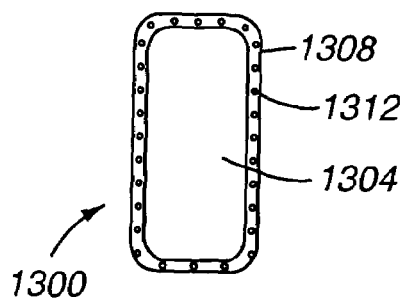
Fig. 14
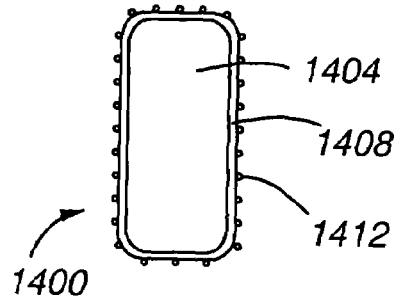
Fig. 15

FLOCKED ARTICLES AND METHODS OF MAKING SAME

CROSS-REFERENCE TO RELATED APPLICATIONS

The present application claims the benefits of U.S. Provisional Patent Application Ser. Nos. 60/393,362, filed Jul. 3, 2002; 60/416,098, filed Oct. 4, 2002; 60/422,206, filed Oct. 29, 2002; 60/432,952, filed Dec. 11, 2002; and 60/443,986, filed Jan. 30, 2003, all to Abrams, each of which is incorporated herein by this reference.

FIELD OF THE INVENTION

This invention relates generally to flocked articles and specifically to flocked articles having antimicrobial properties and to molded articles having flocked surfaces.

BACKGROUND OF THE INVENTION

There is an increasing awareness among consumers of the problems presented by microbes, such as fungi, viruses, bacteria, protozoa, parasites, and the like. The news media broadcasts a steady stream of reports documenting a variety of health problems associated with microbes—from microbes impacting food supplies and fungus infesting building ventilation systems to mold contaminating homes and schools. Environmental officials have even gone so far as to call mold "the crisis of the decade" as federal and local governments are creating legislation designed to set mold exposure limits. As a consequence, though sales of antimicrobial products continue to grow rapidly, demand for such products continues to outpace supply.

There are a number of known techniques for delivering an antimicrobial agent. An "antimicrobial agent" refers to any compound or element that can kill or inhibit the growth of a microbe or other undesired organism, such as a mite. Examples of delivery techniques are discussed in U.S. Pat. Nos. 5,556,669; 4,938,958; 4,938,955; and 4,906,464, each of which is incorporated herein by this reference, and in *Surfaces*, Vol. 1, Issue 1. Such examples include antimicrobial coatings on household articles, such as cooking utensils, switch plates, and heating coils, HVAC components such as duct work, metal articles, such as steel, and carpet fibers.

A limitation of conventional systems is an unacceptably low likelihood that a microbe will come into contact with the antimicrobial agent, particularly in the case of contact microbes. It has been discovered that the surface area of the antimicrobial-containing surface is directly dependent upon the efficacy of the antimicrobial agent in killing microbes. However, existing antimicrobial-containing surfaces, including carpet fibers containing antimicrobial agents, generally have a relatively low surface area and therefore limited efficacy and low kill rates.

SUMMARY OF THE INVENTION

These and other needs are addressed by the present invention. The present invention is directed to flocked articles having antimicrobial properties and/or being incorporated into molded articles, which can include antimicrobial-containing flock.

Regarding flocked articles having antimicrobial properties, flock fibers can be applied to a substrate in high densities, due to the small diameters of the flock fibers and their parallel orientation to one another, to provide an article having high levels of efficacy in killing microbes. The antimicrobial agent(s) can be located inside of (in situ) or on the exterior of the fibers (coated), depending on the application. The antimicrobial agent can be any organic or inorganic agent, as desired.

Regarding molded articles, a method of providing a mold insert for manufacture of a molded article is provided in which a flocked surface, a (preformed) permanent adhesive film, and a (preformed) backing film are substantially simultaneously laminated together to form an intermediate structure. The intermediate structure can be formed by known techniques, such as by thermoforming, vacuum forming and hydro-forming techniques, into the mold insert. The intermediate structure is typically a planar article while the mold insert is a three dimensionally shaped article designed to mate with the surface of the mold. The permanent adhesive is at least partially (and typically fully) activated before positioning of the mold insert in the mold.

For additional aesthetic appeal, the mold insert may include a design media other than the flock fibers. Examples of such additional media include coatings, beads, metallic flakes, glitter, reflective material, etc.

The present invention can have a number of advantages compared to conventionally decorated molded articles. For example, the flocked antimicrobial articles of the present invention can have a high likelihood that a microbe will be killed by the antimicrobial agent when the microbe is contacted with the flock. This is due, at least in part, to the high surface area of the antimicrobial-containing flocked surface, which can provide the antimicrobial agent with a high efficacy in killing microbes. The various processes described herein can produce attractive multi-colored flocked surfaces on molded articles. The (pre-colored or permanently colored) multi-colored flock (either producer colored (or pigment-in-polymer) or dyed flock) can be selected to provide superior soil and stain concealment and resistance to chemical or high UV exposure, which can be particularly important in automotive or outdoor use. Compared to existing textile-coated molded articles, the molded particles produced according to the present invention can provide greater formability possibilities for parts having more extreme geometry, simpler mold and molding process requirements, superior abrasion and wear resistance, an easier-to-clean fiber coating surface with an open fiber construction, lower manufacturing costs, superior visual appearance (adjustable-simulated textiles created with graphics), an extremely soft texture (adjustable fiber diameter, length, and density), and the ability to include authentication taggers for security protection. These and other advantages and aspects of the invention will be evident from the discussion herein.

BRIEF DESCRIPTION OF THE SEVERAL VIEWS OF THE DRAWINGS

FIG. 4 is a side view of yet another embodiment of a mold insert film according to the present invention;

FIG. 5 is a side view of yet another embodiment of a molded article of the present invention;

FIG. 12 is a cross-sectional view of a flocked surface according to another embodiment of the present invention;

FIG. 13A is a cross-sectional view of a fiber in a plane parallel to the flock fiber's long axis according to an embodiment of the present invention;

FIG. 13B is a cross-sectional view of the fiber taken along line 13B-13B of FIG. 13A in a plane normal to the flock fiber's long axis;

FIG. 14 is a cross-sectional view of a fiber in a plane parallel to the flock fiber's long axis according to another embodiment of the present invention;

FIG. 15 is a cross-sectional view of a fiber in a plane parallel to the flock fiber's long axis according to yet another embodiment of the present invention.

DETAILED DESCRIPTION OF THE INVENTION

Flocked Articles Having Antimicrobial Properties

Figure 1:
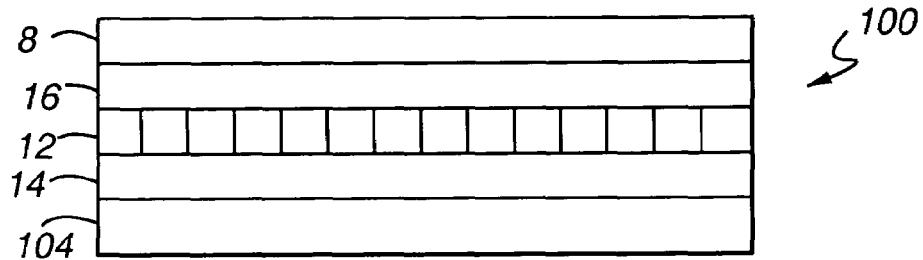
FIG. 1 is a side view of another embodiment of a flocked mold insert film according to the present invention.

Referring to FIG. 12, a flocked surface 1100 is depicted. As will be appreciated, the flocked surface 1100 comprises a plurality of flock fibers 1104a-n adhered to a substrate 1108 by an adhesive 1112. At least most, if not all, of the flock fibers 1104a-n comprise an antimicrobial (organism) agent (not shown) that is efficacious in killing microbes, such as molds, fungi, viruses, bacteria, and mildew.

The flock fibers 1104a-n can be formed from any natural or synthetic material. Synthetic material includes rayons, nylons, polyamides, polyesters such as terephthalate polymers and acrylic, and natural material includes cotton and wool. In one configuration, a conductive coating or finish is applied continuously or discontinuously over the exterior surface of the flock fibers to permit the flock fibers to hold an electrical charge.

The conductively coated flock is applied by electrostatic flocking techniques such as described in U.S. Pat. Nos. 4,810,549; 5,207,851; 5,047,103; 5,346,746; 5,597,637; 5,858,156; 6,010,764; 6,083,332; and 6,110,560 and in copending U.S. patent application Ser. Nos. 09/548,839; 09/621,830; 09/629,746; and 09/735,721, each of which is incorporated herein by this reference. In a direct flocking configuration of the process, the flock is electrostatically charged (while a permanent substrate is given the opposite electrical charge) and inserted into a permanent adhesive 1112 on the desired substrate (which in the case of molded articles is the backing film). In a transfer flocking configuration of the process which is discussed in detail below, the flock is electrostatically charged (while a sacrificial carrier sheet or temporary substrate is given the opposite electrical charge) and inserted into a temporary adhesive (not shown) on the carrier sheet. The carrier sheet is later removed before, after or during bonding of the flock to the substrate.

In either configuration, electrostatic flocking causes typically at least most, and even more typically at least about 65%, of the individual flock fibers to be oriented transverse to and typically perpendicular to the planes of the substrate 1108 surface (in direct flocking) or the carrier surface (in transfers). Compared to woven textiles, this non-woven fiber alignment forms a desirable dense pile finish.

In these processes, different colors of flock (or fibers) are typically applied through separate screens or a single color flock is applied and later sublimation printed to form the multi-colored design. In multi-color flocking, the screens have a distribution of openings consistent with the desired locations of the respective colors of flock fibers. Other techniques, which can mount the flock in a desired position and in such a way as to hold or entrap the flock after curing, can also be employed in either the direct or transfer flocking process configurations. Such techniques include vibration, gravity, and spraying of the flock onto the adhesive-coated surface.

The adhesive 1112 can be any suitable adhesive for the application. As will be appreciated, an "adhesive" is any substance, whether inorganic or organic, natural or synthetic, that is capable of bonding other substances together, typically by surface attachment. Examples of suitable adhesives include high temperature adhesives, such as polybenzimidazoles and silica-boric acid mixtures or cermets, hot-melt adhesives, thermoset adhesives, thermoplastic adhesives, and polyurethane. The adhesive may be applied to the substrate 1112 in the form of a resin dispersion. "Hot-melt adhesives" generally refer to a solid material that forms a mechanical or melt bond upon heating and subsequent cooling, "thermoset adhesives" generally refer to a polymer that solidifies or "sets" irreversibly when heated, "thermoplastic" generally refer to a polymer that softens when heated and returns to its original condition when cooled to room temperature, and "resin dispersions" generally refer to a solid phase of particles of one or more resins dispersed in a continuous, typically liquid, phase (e.g., a plasticizer). The resin dispersion gels and/or fuses when heated. The resin dispersion can be water-based or solvent-based and in the form of a liquid or paste or in the form of a solid mixture of a resin and plasticizer. The "gelled phase" refers to a semi-solid phase, such as a viscous jelly-like product, or solid phase of an organic material that has little or no cross-linking while the "fused" stage refers to a solid phase in which at least most, if not all, of the polymers in the resin particles are cross-linked. Plastisol™ is a type of resin dispersion and is a dispersion of one or more resins in a plasticizer. Plastisol™ is in the form of a liquid or paste. The resin component preferably is an organic, crosslinkable polymer or oligomer that, when converted to its final state for use, is crosslinked, and, after being crosslinked, is high frequency weldable. Preferred resins include poly(ethylene vinyl acetate), poly(vinyl chloride), polyamides and polyurethanes, and more preferably are a polymer or oligomer of a vinyl monomer, such as polyvinyl chloride. The resin dispersion can include fine particles of polymers or copolymers, as well as one or more of plasticizer(s), viscosity reducer(s), viscosity increaser(s), stabilizer(s), filler(s), thickener(s), curing agent(s) (such as an isocyanate), pigment(s), etc. Typically, the plasticizer is the continuous phase in the resin dispersion and acts as a vehicle for the dispersed resin and other additives. The resin acts as a binder for all of the other additives. The pigment, if any, determines the color and opacity of the resin film. The filler increases the viscosity and/or thickness of the resin dispersion film, as applied, proportionally with the concentration of the filler. The stabilizer, used when pigment is added, prevents discoloration of the resin film. The viscosity reducer effectively reduces the viscosity of the resin dispersion, which can be important in screen printing deposition methods. The viscosity increaser increases the viscosity of the resin dispersion. Preferably, at least some of the volume of the continuous liquid phase comprises one or more liquid plasticizers.

The antimicrobial agent can be any suitable agent that inhibits microorganisms and, particularly, pathogenic microorganisms, i.e., an agent that has antimicrobial activity. As used herein, "antimicrobial activity" is defined as any activity of an agent which has the general characteristic of being able to reduce the growth of, damage, and/or neutralize the activity of the microorganism. More specifically, an agent with antimicrobial activity is any agent which inhibits or destroys a microbe by depriving it of essential nutrients, such as iron, or by causing structural disruption or metabolic injury to the microorganism. Bacterium that may be inhibited using the present method include, but are not limited to: a *spirochete*, a *mycobacterium*, a Gram (+) cocci, a Gram (−) cocci, a Gram (+) bacillus, a Gram (−) bacillus, an *anaerobic* bacterium, a *rickettsias*, a *Chlamydias* and a *mycoplasma*. A fungus that may be inhibited using the present method include, but are not limited to: a pathogenic yeast, a mold and a dimorphic fungus. Preferred viruses to inhibit by the present method include enveloped viruses. As used herein, the term "antimicrobial agent" includes, without limitation: antifungal agents, antiviral agents, antibacterial agents, antiprotozoan agents and antiparasite agents.

As will be appreciated, suitable antimicrobial agents can be divided into two categories, namely organic and inorganic. Organic agents generally interact with one particular site in the organism using a single mechanism. Inorganic agents generally attack organisms through several mechanisms that interact with basic functions in the cell, essentially suffocating or starving the organism. Preferred organic agents include carbon- or silicone-based compounds, such as triclosan, Microban™, hydroxy acids, carboxylic acids, Neosporin, and mixtures thereof. Preferred inorganic agents include chlorine compounds and metals, such as silver and copper. Known antifungal agents (i.e., antimycotic agents) include amphotericin, griseofuluin, imidazoles, nysterbinafine, and tolmafte. Known antiviral agents (i.e., antimycotic agents) include acyclovir, zidovudine (AZT), and interferons. Known antibacterial agents (i.e., antibiotics) include penicillin, streptomycin, and tetracycline. A particularly preferred agent is AgION™. In AgION, metal ions, typically silver, are contained within a porous matrix, such as a zeolite. In the presence of water, the metal ions are readily exchanged with other ions present in the environment, such as sodium, creating a controlled flow of metal ions to the surface of the host material. The AgION™ is further discussed in the AKCoatings literature from http://www.ak-coatings.com. A preferred AgION™ is type AJ and has a mean particle size of less than about 10 μm, and more preferably of no more than about 2.5 μm, a silver content ranging from about 2.1 to 2.8 wt. %, a maximum water content of no more than about 25 wt. %, and a zinc content of no more than about 20 wt. %.

The antimicrobial agent can be applied to the flock fibers in a number of different ways. Referring to FIGS. 13A and 13B, a flock fiber 1200 is depicted according to a first configuration. The flock fiber 1200 comprises a conductive coating 1204 and a plurality of antimicrobial agents 1208 dispersed within the polymeric matrix 1212 of the fiber 1200. Over time, the agent migrates through the polymeric matrix 1212 and/or coating 1204 to the surface 1216 of the fiber 1200.

In one configuration, the fiber 1200 is prepared by compounding, such as in an extruder, a polymeric resin with the agent to form a concentrated resin. For example, the concentrated resin can include a first concentration of the agent, such as 5 wt % or more. The concentrated resin is pelletized and introduced into an extruder head at a suitable letdown ratio as a polymeric resin (free of the agent) is introduced into the extruder. The letdown ratio (or volumetric ratio of the concentrated resin to the polymeric resin (free of agent)) depends on the final desired concentration of the agent in the fiber. The outputted resin contains a second, lesser, concentration of the agent. The outputted resin can be formed into fibers which are then electrostatically coated by known techniques.

To permit the agent to contact microbes, the conductive coating 1204 must be carefully selected/applied to the fiber. In one approach, the coating is applied discontinuously over the exterior surface of the polymeric matrix 1212. In this manner, the agent is not blocked in its migration by the coating. This approach is used if the coating prevents migration of the agent. In another approach, the coating is selected to degrade or wear off after application to the substrate so as to be permeable to the agent or removed at least partially from the polymeric matrix 1212. A biodegradable conductive coating is particularly useful in this approach. In yet another approach, the coating is selected to alter in form after application so as to be permeable to the agent. The alteration in form can be caused, for example, by reaction with materials in the exterior or ambient atmosphere, such as water.

Referring to FIG. 14, a flock fiber 1300 is depicted according to a second configuration. In this configuration, the polymeric matrix 1304 is at least substantially free of the agent. The agent 1312 is incorporated within the conductive coating 1308. The agent, for example, is mixed into the coating before application. The coating can be deposited by any suitable technique onto the polymeric matrix, such as by spraying the coating as a liquid onto the fiber or dipping the fiber into the liquid coating.

Referring to FIG. 15, a flock fiber 1400 is depicted according to a third configuration. In this configuration, the polymeric matrix 1404 and coating 1408 are each at least substantially free of the agent. The agent 1412 is applied as a continuous or discontinuous (as shown) layer over (or under) the conductive coating 1408. The layer including the agent 1412 may be applied continuously or discontinuously under the conductive coating 1408, when, for instance, the coating wears off or degrades over time and/or in response to repeated use. After application of the coating to the polymeric matrix 1404, the agent is contacted with the exterior of the coating. The agent can be deposited by any suitable technique onto the coating, such as by spraying a liquid dispersion of the agent in a liquid carrier onto the coating, or dipping the fiber into the liquid dispersion, evaporative deposition techniques, and the like. The liquid carrier can be vaporized after the dispersion is applied to the coating to form the discontinuous layer of agent shown in FIG. 15.

To provide the desired high surface area of the antimicrobial agent, the flock fibers are carefully selected and applied to the substrate/carrier sheet. Preferably, at least most, and even more preferably at least about 75%, and even more preferably all, of the flock fibers have a preferred denier of no more than about 5, more preferably no more than about 3, and even more preferably no more than about 2, with a range of from about 1.5 to about 3.5 being typical and having a titre from about 0.5 to about 20 Dtex (from about 0.5 to about $20 \times 10^{-7}$ Kg/m) and even more preferably from about 0.9 Dtex to about 6 Dtex. The length of at least most, and typically at least about 75%, of the fibers is preferably no more than about 4 mm, more preferably no more than about 2 mm, and even more preferably no more than about 1 mm, with a range of from about 0.3 to about 3.5 mm being typical. The fiber placement density relative to the surface area of the upper surface 1116 of the substrate (on which the flock is deposited) is preferably about at least about 50% fibers/in$^2$, even more preferably at least about 60% fibers/in$^2$, and even more preferably at least about 70% fibers/in$^2$ of the surface area of the substrate surface 1116. The number of individual fibers per unit of surface area of the substrate surface 1116 (on which the flock is applied) is preferably at least about 50,000 fibers/in$^2$, even more preferably at least about 75,000 fibers/in$^2$, and even more preferably at least about 100,000 fibers/in$^2$ of surface area of the substrate surface 1116. As will be appreciated, a fiber placement density of 70% equates to 1,683,401 fibers/in$^2$ of the surface area of the substrate surface 1116, and a placement density of 60% equates to a 1,442,915 fibers/in$^2$ of the surface area of the substrate surface 1116.

The above parameters can yield a very high exposed fiber surface area for each unit area of substrate surface 1116. Typically, the total external surface area of the fibers per unit area (in$^2$) per unit area of the surface 1116 is at least about 40. In some applications, the total external surface area of the fibers per unit area can be at least about 100,000 in$^2$, more typically at least about 250,000 in$^2$, and even more typically at least about 200,000 in$^2$, with from about 175,000 to about 500,000 in$^2$ being a typical range. When compared to an antimicrobial agent applied to a flat, planar surface of the same unit area, the percent increase in surface area (fiber versus film) is typically at least about 100,000%, more typically at least about 150,000%, and even more typically at least about 200,000%.

The flock fibers of the present invention can be used in any application where flock is employed. For example, the flock fibers can be substituted for the flock in heat transfers, direct flocked articles, molded flocked articles, and the like, such as disclosed in the following patents/patent applications: U.S. Provisional Application Ser. Nos.: 60/422,206, filed Oct. 29, 2002, entitled "Process for Printing a Flocked Article", to Abrams; 60/393,362, filed Jul. 3, 2002; 60/416, 098, filed Oct. 4, 2002; 60/403,992, filed Aug. 16, 2002; 60/405,473, filed Aug. 23, 2002; 60/366,580, filed Mar. 21, 2002; 60/327,642, filed Oct. 5, 2001, 60/344,862, filed Nov. 8, 2001, and 60/332,647, filed Nov. 21, 2001; and 60/393, 362, filed Jul. 3, 2002; U.S. Pat. Nos.: 4,810,549; 5,047,103; 5,207,851; 5,346,746; 5,597,637; 5,858,156; 6,010,764; 6,083,332; 6,110,560; U.S. patent application Ser. Nos.: 10/265,206, filed Oct. 5, 2002; 09/629,746, filed Jul. 31, 2000; 09/735,721 filed Dec. 13, 2000; 09/621,830 filed Jul. 24, 2000; 29/058,551 filed Aug. 19, 1996; 09/548,839 filed Apr. 13, 2000; and 09/973,113 filed Oct. 9, 2001, each of which is incorporated herein by this reference.

Figure 16:
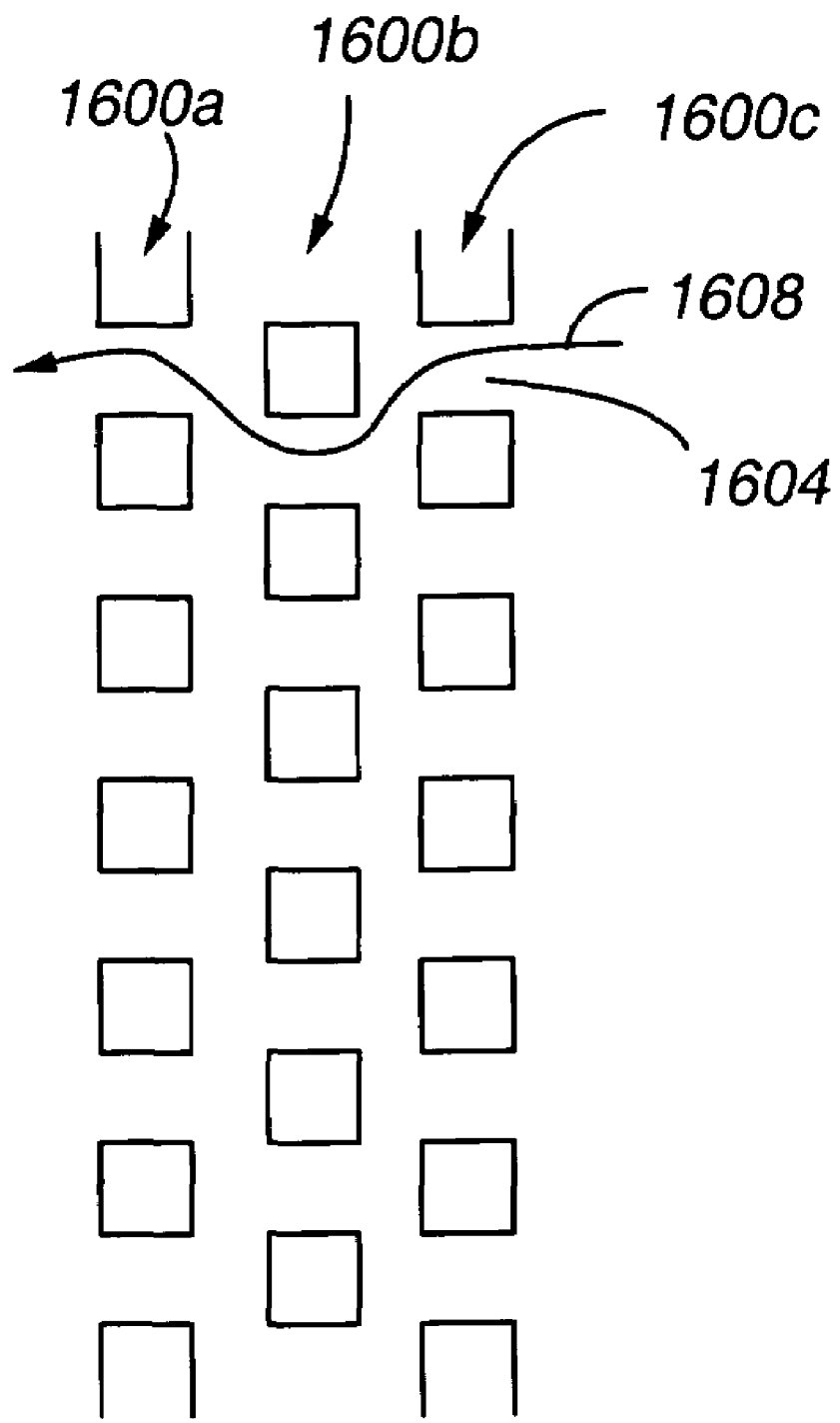
FIG. 16 is a cross-sectional view of an air purification device according to yet another embodiment of the present invention.

The antimicrobial flock can be used in a virtually endless number of applications. By way of illustration, the antimicrobial flock can be used on articles coming into contact with human hands or other body parts, such as telephones, computer keypads, computer mice, automotive passenger interiors (such as steering wheels, dashboards, consoles, and seats), toilet seats, door knobs, handles, buttons, handrails, faucets, switches, floor coverings, insoles, furniture, chairs, and the like, articles used for purifying air, cleaning wipes, food preparation surfaces, medical devices, refrigerators, cleaning utensils, packaging, humidifiers, clothing, blankets, sheets, and the like. In the case of air purification devices, it is desirable that the permeable and porous flocked surfaces be located downstream of particulate removal devices, such as filters, to avoid clogging of the flocked surfaces. It is further desirable that the air passageways through the flocked surfaces be offset from one another to provide a tortuous (nonlinear) pathway for airflow. This will increase the likelihood that the air will contact antimicrobial-containing flock fibers. Such a configuration is shown in FIG. 16, in which a plurality of adjacent flocked (using antimicrobial flock) perforated plates 1600a-c, each of which has a plurality of perforations 1604 are placed in a stacked, (typically spaced apart), parallel configuration. The perforations 1604 in adjacent plates are offset from one another to provide a tortuous path of air flow 1608.

Molded Articles

Figure 2:
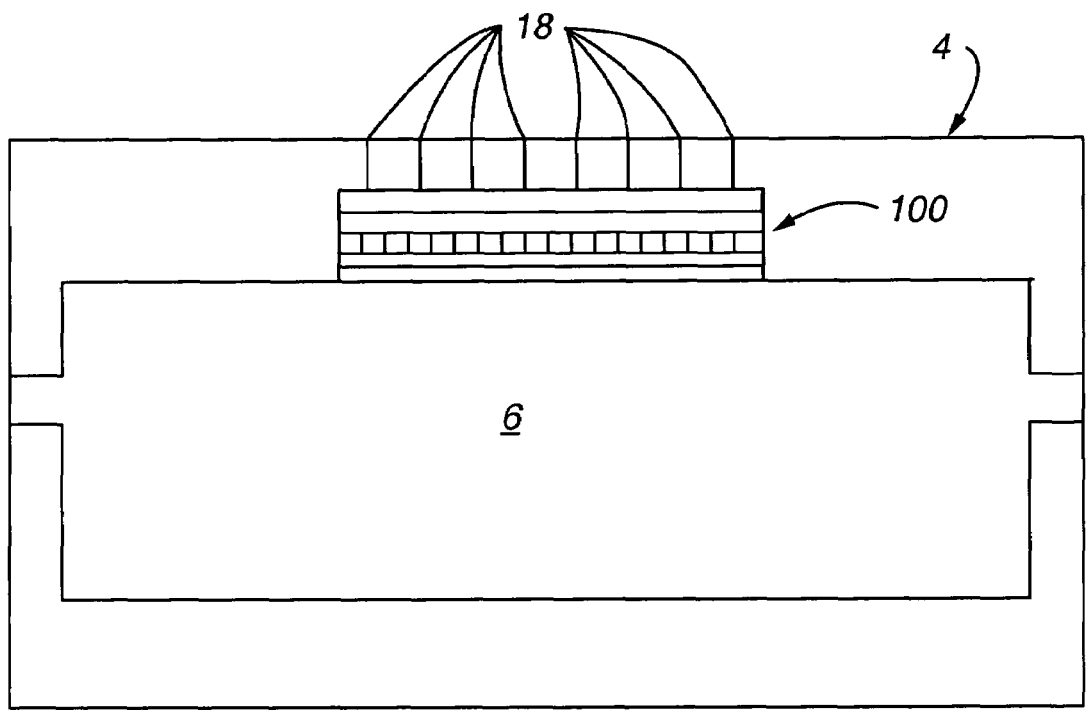
FIG. 2 is a side cross-sectional view of a first configuration of a closed mold formed to accommodate the mold insert of FIG. 1.

Referring to FIGS. 1 and 2, a mold insert 100 of the present invention is shown in place in a mold 4 to be co-molded with a plastic article 6. In FIG. 1, the mold insert 100 is shown on top of the article 6. The mold insert 100 comprises a dimensionally stable sheet 8 to which a conventional flock transfer release adhesive 16, usually silicone or latex wax, is applied in the reverse of a desired pattern or with overall coverage of the sheet, corresponding to the overall image which is to be flocked and transferred. The flock 12 is applied to the release adhesive 16 in any conventional manner, such as, conventional electrostatic techniques, vibration, air flow, gravity, or combination thereof. The lower ends of the flock 12 are contacted with a permanent binder adhesive 14, which binds the flock into a unit. The binder adhesive 14 may contain an additional adhesive or compatible film, for promoting the adhesion of the transfer to the resin in molding. The adhesive 14 is in turn contacted with a backing film 104.

FIGS. 1 and 2 illustrate the application of the mold insert 100 to a molded article 6 during the molding process. The mold insert 100 is positioned in the mold 4 by any suitable method, such as by the use of a vacuum. Vacuum holes 18 are shown in the mold 4 which pass through the mold body. As seen, the mold insert 100 is in contact with the vacuum holes 18. A vacuum can be drawn through the holes 18 to hold the mold insert 100 in place. The mold insert needs to be held securely in the mold to maintain the mold insert in the desired location on the finished plastic part. If a slight depression (of about 1 mm) is built into the mold cavity to accommodate the mold insert, it will be flush with the molded plastic surface of the finished part. This is seen in FIG. 2. If there is no depression, the flock decoration will stand up on top of the plastic surface.

After the transfer is positioned in the mold, the mold is closed and resin is injected into the mold. After the resin is injected into the mold, the mold is cooled by circulating water around the exterior of the mold. As the resin cools, it solidifies and forms a permanent melt bond to the backing film 104. When the part is cooled sufficiently the mold opens up and the part is ejected. Finally, the release sheet 8 and release adhesive 16 are peeled off the fibers 12 to reveal a finished, flocked, surface on the newly molded part.

As will be appreciated, the solidified resin can be any biodegradable or non-biodegradable moldable material. Preferably, the resin is a condensation or addition polymer having thermoplastic behavior. More preferably, the resin is a high polymer of one or more of a fluorocarbon, hydroxy acid, carboxylic acid, ester, ketone, hydroxy carboxylic acid, tetrafluoroethylene, nylon, phenol, formaldehyde, amide, imide, aryl, ketone, cellulose, ethylene, styrene, urethane, carbonate, isocyanate, vinyl, vinyl chloride, olefin, acetate, propylene, methyl methacrylate, vinyl acetate, ethylene terephthalate, cyclohexylenedimethylene terephthalate, ethylene glycol, terephthalic acid, hexamethylene diamine, sebacic acid, and butylene terephthalate and copolymers, terpolymers, composites, and blends thereof or an amino resin, epoxy resin, acrylic resin, silicones, and acrylonitrile-butadiene-styrene (ABS) resin. The resin can be in the form of a solid, liquid, semi-solid, or semi-liquid when injected into the mold and typically polymerizes in the mold due to heat and/or chemical reaction. As will be appreciated, a thermoplastic is a high polymer that softens when exposed to heat and returns to its original condition when cooled to room temperature.

The sheet 8 can be any suitable transfer carrier that is formable and dimensionally stable with the flock. Examples of other types of suitable transfer carriers include plastic films. The sheet 8 is preferably a discontinuous sheet or a running web line material. The carrier sheet or film has surprisingly been found to assist in robotically feeding the mold insert or mold insert film into the forming tool and/or the mold itself. A vacuum is able to pick up the mold insert or mold insert film and transport and position the insert at a desired location in the forming tool/open mold. Other techniques to establish a vacuum connection include (i) the use of a discontinuous carrier sheet, where the carrier sheet is positioned to contact the vacuum suction cups but not in other adjacent areas where flock is exposed due to an absence of an overlying carrier sheet, and (ii) the use of a discontinuously applied or located flock surface, where no flock fiber is deposited in first region(s) to provide an exposed permanent adhesive or backing film in the first region(s) to contact the suction cups from the flocked side of the insert. Flock is deposited in one or more adjacent second region(s) where no vacuum suction cup is positioned.

The release adhesive 16 is selected such that the bonding force between the release adhesive 16 and the flock 12 is less than the bonding force between the adhesive 14 and flock 12 on the backing film 104. In this manner, the sheet 8 and release adhesive 16 can be removed after lamination of the transfer without causing separation of the flock from the adhesive film 14 and backing film 104. Preferably, the melting point of the release adhesive 16 is greater than the maximum temperature realized by the injected resin in the mold (and the melting point of the resin) and more preferably greater than the maximum temperature realized by the release adhesive 16 during molding. As will be appreciated, for a cooled mold it is possible that the melting point of the release adhesive may be slightly less than the resin temperature.

Adhesive 14 can also be any suitable adhesive, with water-, UV-curable, and solvent-based adhesives being preferred. Preferably, adhesive 14 has a melting point that is greater than the maximum temperature realized by the injected resin in the mold (and the melting point of the resin) and more preferably greater than the maximum temperature realized by adhesive 14 during molding (which melting point may be less than the resin temperature for a cooled mold). Particularly preferred adhesives include hot melt thermoplastic and thermoset adhesives. As will be appreciated, thermoset adhesives solidify or set irreversibly when heated above a certain temperature. This property is usually associated with a cross-linking reaction of the molecular constituents induced by heat or radiation. Thermoset adhesives can include curing agents such as organic peroxides or sulfur. Examples of thermosetting adhesives include polyethylene, polyurethanes, polyamides, phenolics, alkyds, amino resins, polyesters, epoxides, and silicones.

As noted above, the flock 12 used in any of the processes discussed herein can be any electrostatically chargeable fiber, such as the fibers discussed above. Preferably, the flock has a melting and/or softening point that is greater than the temperatures experienced by the flock in the mold (which, conservatively, is no less than the maximum temperature of the resin during the molding process). Acrylic flock is therefore undesirable in many applications. The flock is also preferably resilient under the pressures experienced in the mold. Resilient flock, such as certain polyesters, and nylon flock, may matt down during molding but, after ejection from the mold, self-restore to its original orientation relative to the backing film. In most applications, the orientation is at least substantially orthogonal (perpendicular) to the surface of the backing film. An advantage of flock resiliency is the ability to compress the flock during molding to avoid thinning of the wall thickness of the finished molded article. Finally, it is preferable that the flock have high abrasion resistance and color fastness. Nylon and poly(ethylene terephthalate) or PET (and other terephthalates polymers) flock is desirable due to its abrasion resistance and color fastness. In contrast, rayon flock, though resilient, is undesirable in certain applications due to relatively poor abrasion resistance and color fastness.

It has been discovered that certain polyesters, particularly poly(cyclohexylenedimethylene terephthalate) ("PCT"), are highly attractive. Many polyester fibers, such as polyethylene terephthalate, soften at molding temperatures/pressures and/or have poor loft retention, causing an unattractive article and unpleasant surface to the touch. PET in particular typically matts down during molding and must be brushed or otherwise restored to a plush state. PCT, on the other hand, has been found to be highly resilient and readily rebounds (or self-restores) from matting when removed from the mold.

PCT has a number of surprising and unexpected advantages relative to polyethylene terephthalate ("PET"), nylon, and rayon in molding applications. PCT has a higher melting point (290° C.) than nylon 66 (264° C.) and nylon 6 (223° C.), and PET (250° C.) and a higher deflection temperature for a selected applied pressure or force. PCT is more resilient than PET (e.g., PCT has a compression recovery of about 44% from 34.5 mPa while PET has a compression recovery of about 31% from 34.5 mPa).

PCT is formed by polymerizing a suitable ester, such as dimethyl terephthalate, with a suitable alcohol, such as 1,4 cyclohexane dimethanol, to a desired degree of polymerization under conditions and using catalysts known to those of ordinary skill in the art. After polymerization, the polymerized material is extruded in the form of a ribbon, and the ribbon hardened and cut into chips. The chips are dried and then put into hopper reservoirs for melting. The chips are melt spun into fibers, or heated, extruded through spinnerets at an extrusion temperature, cooled upon contact with the air, and wound around cylinders. The fibers are hot stretched at a drawing temperature until they are about five times their original length to decrease their width. The drawing results in optimal orientation of the molecules inside the fiber and results in a desired strength. The fibers can be annealed at an annealing or heat set temperature. The polymer may be mixed with suitable additives, such as blend compatible polymers, plasticizers, delusterants, dye stuffs, and the like.

Preferably, at least one of the extrusion temperature, drawing temperature and heat set temperature is at least about 180° C., more preferably of at least about 190° C., and even more preferably of at least about 200° C. This temperature can be important to providing PCT with suitable properties for molding to "lock in" the resiliency.

As will be appreciated, strength, elasticity, and dye-ability can be impacted by the degree to which the fibers are drawn and by crimping. Additionally, the fibers can be singed, calendared, or embossed.

The preferred polymer composition comprises at least about 25 wt. % PCT, more preferably at least about 50 wt. % PCT, and even more preferably at least about 75 wt. % PCT. The composition may include other desirable additives, typically at least about 0.1 wt % and more typically from about 0.5 to about 25 wt % plasticizer(s). Suitable plasticizers are known to those skilled in the art.

The dimensionally stable substrate or backing film 104 prevents dislodgment of the mold insert from the desired position in the mold and flock from the adhesive 14 due to pressurized flow of the resin into the closed mold during resin injection. The backing film 104 preferably is a formable thermoplastic material having a melting point that is at or near the maximum temperature experienced by the backing film 104 in the closed mold (which is typically less than the melting point and maximum temperature of the resin) to provide a melt bond and tensile and compressive strengths and thermal stability sufficient to withstand the maximum pressures experienced in the closed mold without warping or shrinking. The softening point of the backing film is typically slightly lower than the maximum temperature realized by the resin and backing film during molding. As will be appreciated, it is important that the resin 6 be chemically and physically (e.g., thermally) compatible with the substrate 104 to produce a strong melt bond between materials and thus an integral article after removal from the closed mold. Preferably, the substrate or backing film is a polymeric material and the polymers in the substrate 104 melt bond with the polymers in the resin 6. Exemplary backing films include monomers, oligomers, or polymers (which term includes copolymers, terpolymers, etc.) of styrene, acrylics, vinyls, olefins, cellulosics, carbonates, urethanes, amides, ethylenes, carbonates, propylenes, and esters, acrylic butyl styrene (ABS), and mixtures thereof A particularly preferred substrate for many resins is a polycarbonate. Thus, the film is able to withstand high pressure and high temperature without degrading, cracking, or melting.

The backing film is preferably nonwoven and neither a textile nor a fabric. Preferably, the backing film is in the form of a cast or extruded continuous film. In one embodiment, the permanent adhesive layer and backing film are each a cast and/or extruded, continuous film. Woven textiles and fabrics can resist forming into a three-dimensional or nonplanar shape due to the weave of the material.

There are several processes to manufacture the mold insert for the mold.

Figure 3:
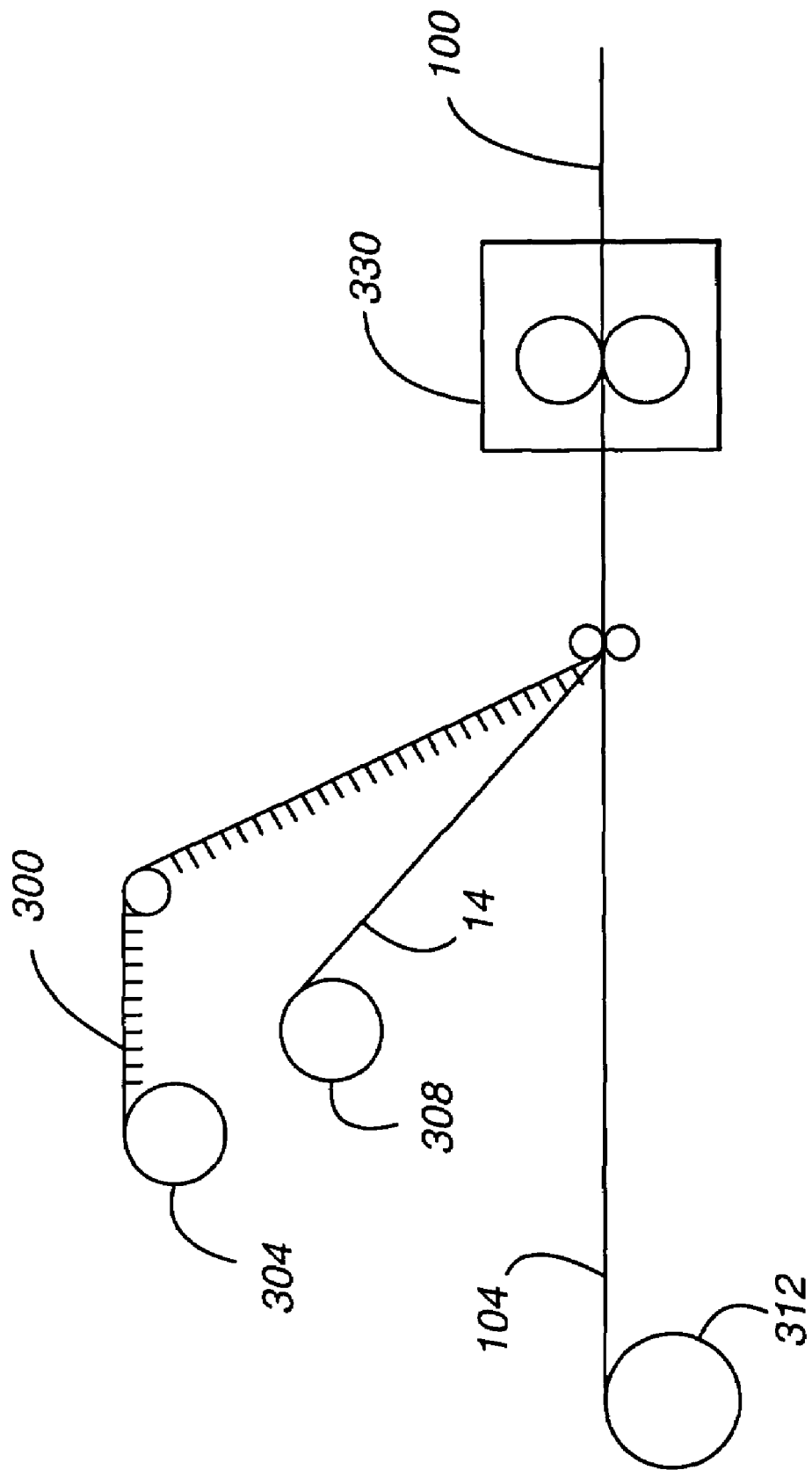
FIG. 3 is a side view of a continuous lamination process for forming a mold insert.

In one continuous process configuration shown in FIG. 3, a mold insert film 100 is formed by first depositing the flock 12 on the release adhesive 10 which is located on the sheet 8, to form a flocked transfer sheet 300. The flocked transfer sheet 300 is positioned on a roll 304. The release adhesive 10 temporarily holds the flock in position on the sheet 8. The release adhesive and/or flock can be deposited over the entire surface of the sheet 8 or discontinuously over the sheet 8 in a desired pattern, as in the case of multiple colors of flock (each color is applied to the release adhesive in a desired pattern in separate steps with each pattern being nonoverlapping or disjoint). Additional rolls 308 and 312, respectively, are provided for the preformed permanent adhesive film 14 and the preformed backing film 104. Preferably, each of the adhesive film 14 and backing film 104 are calendered, extruded or coextruded films. The flocked transfer sheet 300 is then contacted substantially simultaneously with the (preformed) adhesive film 14 and (preformed) backing film 104 and laminated in a lamination machine 330 by thermal techniques to form the mold insert film 100. During lamination, the various layers are heated to a temperature sufficient to partially or fully activate (e.g., crosslink) the adhesive 14. The mold insert film 100 can then be cut into desired shapes before or after the mold insert film is pre-formed into the mold insert as discussed below. This process can be continuous using a running web line. As will be appreciated, to produce a transfer for later thermal application to a desired substrate, such as a textile, the process would be the same except that the roll of backing film 104 would be omitted.

In another discontinuous process configuration, the mold insert film 100 is formed discontinuously by the following steps:

(a) applying the release adhesive 16 discontinuously to the sheet 8 (in a desired pattern) (which can be continuous over the sheet with later cutting in selected patterns, if desired);

(b) depositing the flock 12, such as by electrostatic techniques, on the release adhesive which is located on the sheet;

(c) heat applying the (permanent) adhesive 14 in a desired pattern (using a lower temperature to exploit the thermoplastic properties of the adhesive only without activating the thermoset (or fully cross-linking the adhesive) to form an intermediate transfer;

(d) cutting the intermediate transfer into desired shapes with a suitable cutting tool such as a kiss-cutting steel rule or laser cutter;

(e) removing or "weeding" unwanted portions of the intermediate transfer;

(f) laminating the sized sheet/release adhesive/flock/adhesive transfer to the backing film 104 using conditions (time, temperature, and pressure) sufficient to fully activate the (permanent) adhesive and permanently attach the intermediate transfer to the backing film 104 to form the mold insert 100.

(g) removing the sheet 8 from the mold insert 100, leaving the fiber image on the mold insert film 100 in the desired areas (e.g., the design is discontinuously distributed over the surface of the film backing).

As will be appreciated, to form a transfer for later thermal application to a desired substrate, such as a textile, steps (f) and (g) would be omitted and additional thermoplastic or thermoset (adhesive) film added to adhere the transfer to the substrate.

As will be further appreciated, step (e) may be replaced by locating a (discontinuously distributed) adhesive 14 onto backing film 104 only in desired areas. The product of this step is then laminated under the cut intermediate transfer (with the cut intermediate transfer, during lamination, being positioned above the product of the new step (e)) to form the mold insert.

The mold insert film 100 of FIG. 1 can be formed into a 3D mold insert as set forth below. The mold insert can be cut to size for precise placement into the mold.

The dimensionally stable sheet 8 may be removed from the mold insert film/mold insert after bonding to the substrate and before location of the transfer in the mold or prior to forming of the mold insert. The latter process configuration is commonly employed as the transfer has a relatively low profile or thickness which can be important for molded articles having thin wall thicknesses.

When the mold insert is placed into the mold, the mold insert preferably fits precisely into corresponding extensions or recesses of the main mold cavity and the mold insert held in place during molding by suitable techniques such as pins, vacuum, etc.

After the mold insert is positioned in the mold, the mold is closed and molding conducted as set forth previously. After molding, the flock fibers typically stand proud of the exterior surface of the molded article.

In another embodiment of the invention, a method is provided that comprises the steps of permanently fiber coating (e.g., direct flocking) an adhesive coated backing film, inserting the fiber-coated film backing into the mold, molding the article, cooling the mold, and removing the flocked article from the mold. The method can additionally comprise an additional step of pre-forming the backing film into a three dimensional shape, after permanently fiber coating the backing film, to mate with the shape of the mold. An example of a direct flocked mold insert 400 is shown in FIG. 4.

The article of the present invention is superior to conventional molded articles using textiles. The differences between a flocked mold insert and a textile mold insert are substantial. A textile is typically (woven or knit) continuously constructed and has a plurality of connected, intermingled, and/or physically overlapped fibers in a multiplicity of transverse, crisscrossed orientations. The disorganized and transverse orientations of the fibers in the textile can have the appearance of a bird's nest. In contrast, a flocked mold insert, due to the precise electrostatic deposition of the fibers, typically has the fibers in parallel orientations perpendicular to the substrate. The fibers typically are at least substantially orthogonal to the planar surface of the backing film. The highly organized density of the fibers provides a plush feel and an attractive appearance. In a flocked mold insert, the fibers can also move independently of one another during the forming process or when being formed or dimensionalized.

As shown in FIG. 5, the direct flocked molded article 300 comprises the film backing 104, adhesive layer 14, flock 12 and solidified resin 6.

Figure 6:
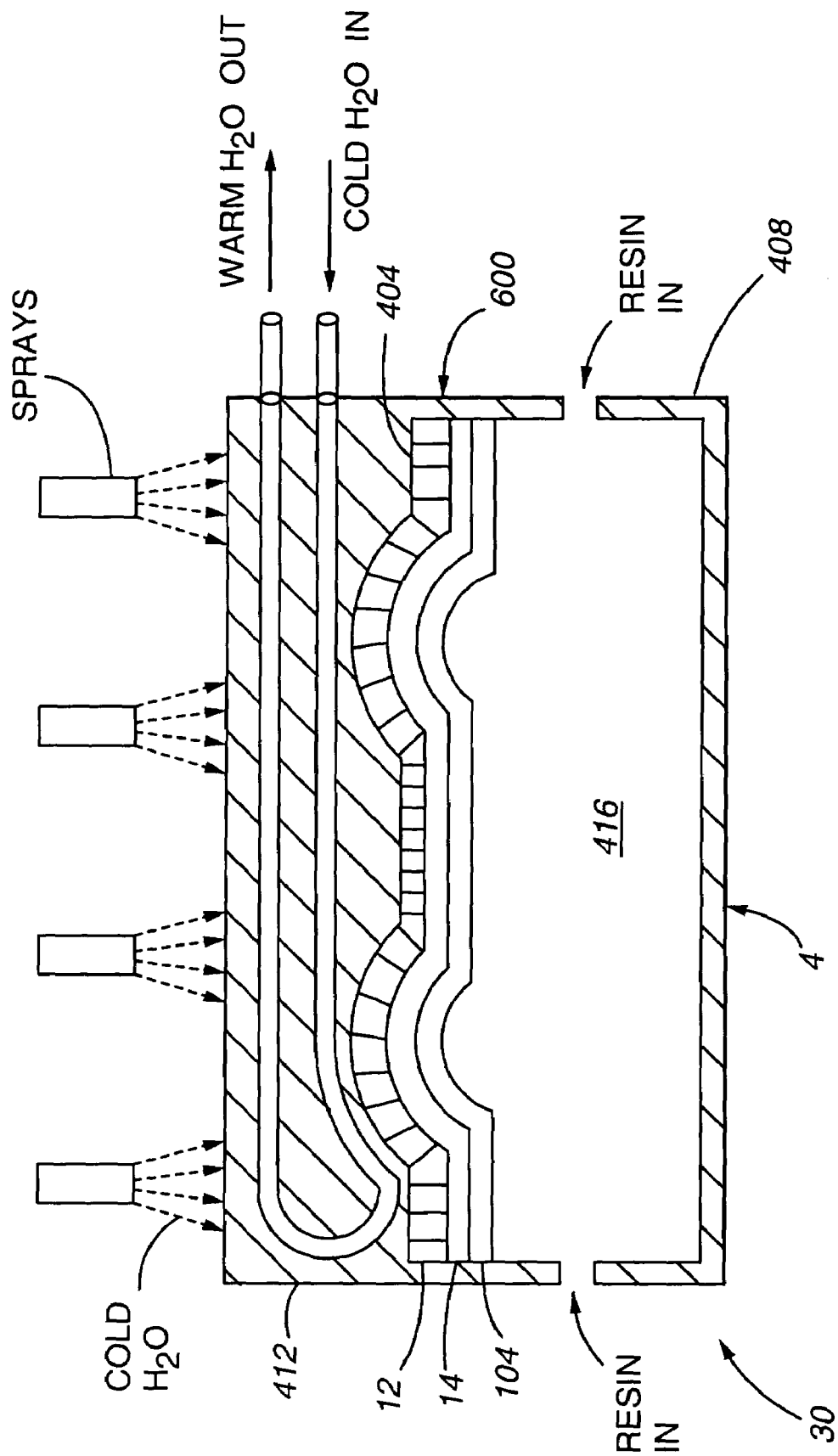
FIG. 6 is a side cross-sectional view of the pre-formed mold insert of FIG. 4 in a closed mold.

As shown in FIG. 6, the flocked backing film can be formed into a three-dimensional shape or mold insert 600 and mate with a surface of the mold 4. The modified flocked backing film has self-aligning or self-locating properties since the three-dimensional shape corresponds to (is a male and/or female counterpart of) the mold surface 404 with which the mold insert engages. In this embodiment, heat and/or pressure and/or vacuum or any other forming process are applied to the flocked backing film to form alternatively a male and/or female counterpart or mold insert to be received in the mold. Preferred forming techniques include thermoforming, e.g., reforming, vacuum forming, hydroforming, etc. The mold insert film can be designed to cover the entirety of the mold or to cover only a portion of the mold. If only a portion of the mold is covered by the flocked insert film, the insert film should be self-locating so that the flocked insert film is aligned or located in the correct portion of the mold. As noted previously, the mold insert is held in place in the mold during the molding process.

As shown in FIG. 6, typical molds 30 for molding parts have two or more parts (tool/die), the cooled lower part 408 where the molten resin will be placed (or with which the molten resin will be contacted) to form the part and a cooled upper portion 412 which has the desired shape of the part. Both parts are constantly cooled by any suitable technique, such as heat transfer or exchange techniques, to assist in the cooling process of the resin. A particularly preferred technique is to circulate a cooling fluid, such as water, through the upper and/or lower parts 408, 412 of the mold. Thus, when the flocked mold insert is inserted into the mold, the mold insert will fit exactly into the shape of the upper part 412 of the mold. As will be appreciated, other suitable types of molds may be used to form the molded article.

Figure 8:
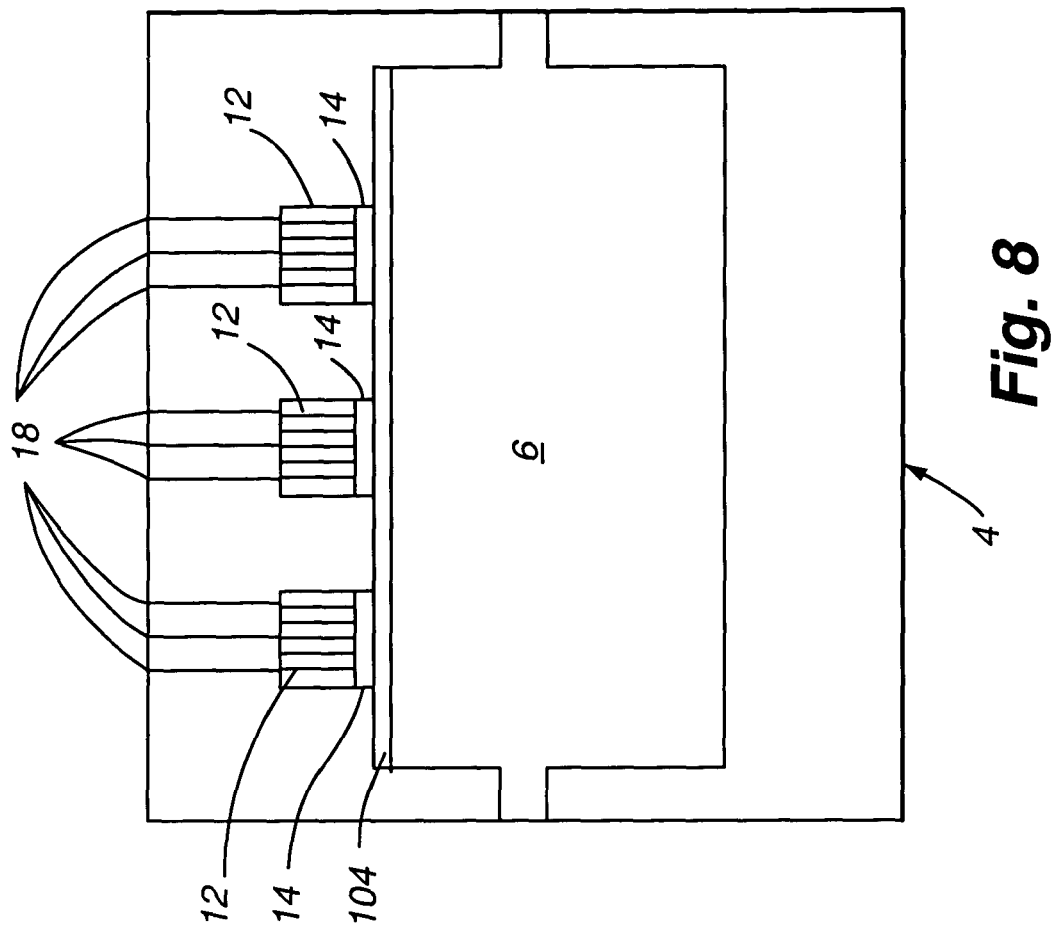
FIG. 8 is a side cross-sectional view of the mold insert of FIG. 7 positioned in a closed mold.
Figure 7:
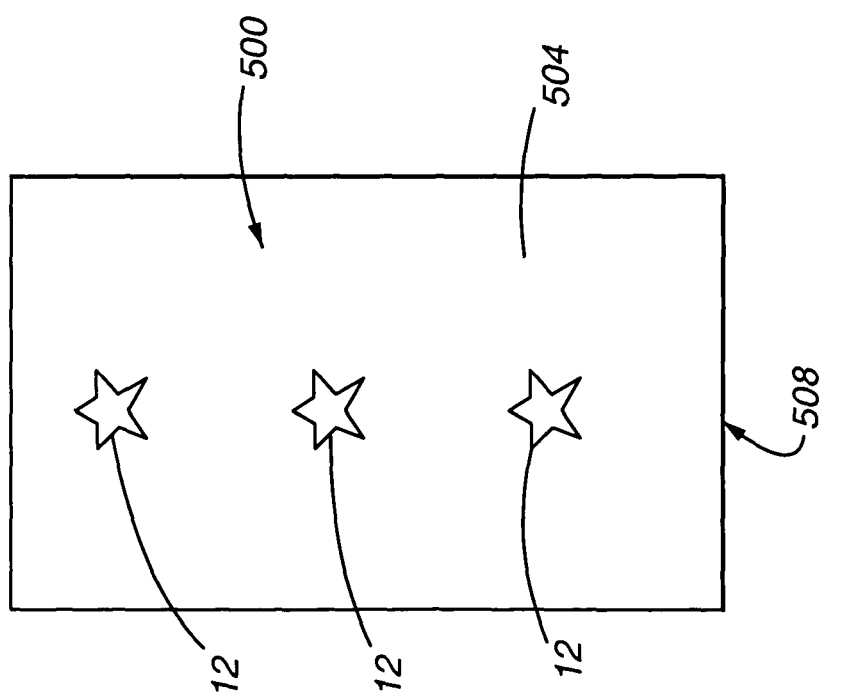
FIG. 7 is a top view of a mold insert according to another embodiment of the present invention.

FIGS. 7 and 8 depict a discontinuously distributed flocked design that is realizable using any of the above described techniques. The flocked design 500 is located on only a portion of the exterior surface 504 of the molded article 508. The portion of the exterior surface 504 can be free of a decorative media or contain decorative media other than flock.

Figure 9:
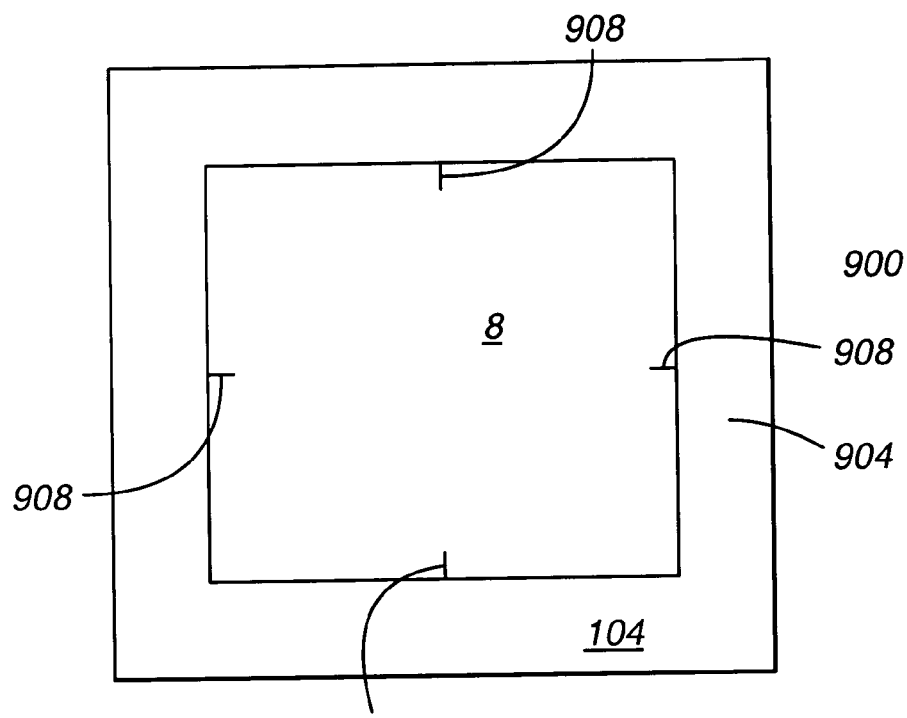
FIG. 9 is a plan view of a mold insert according to another embodiment of the present invention.
Figure 10:
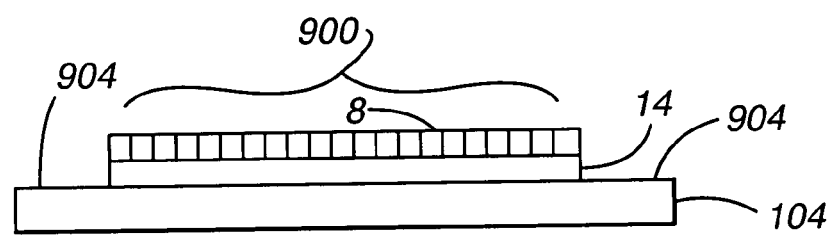
FIG. 10 is a side view of the mold insert of FIG. 9.

In one configuration, flock 8 (and optionally release sheet and release adhesive) are located in only a central section 900 of the backing film 104 while the outer periphery 904 of the backing film is free of flock. This configuration is shown in FIG. 9. One or more locator marks 908 can be used to align the article in forming equipment such that, only the flocked area is formed into the mold insert. This represents a significant savings in materials and processing costs. The locator marks 908, which can be formed by any technique such as the deposition of different colors of flock, are typically aligned with structural features of the forming equipment, such as pins for holding the article in place during forming. After forming, the mold insert can be cut from the backing film 104.

Figure 11:
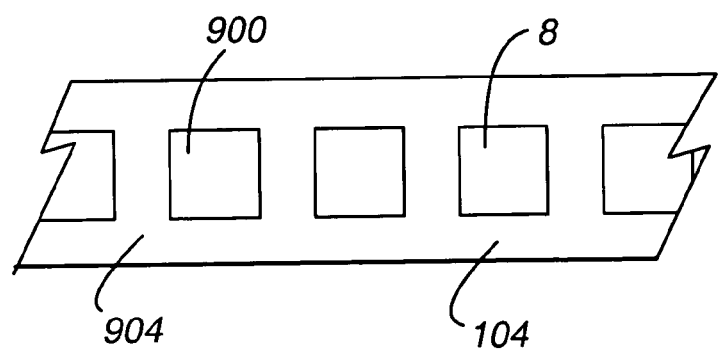
FIG. 11 is a plan view of a plurality of mold inserts on a continuous backing film according to another embodiment of the present invention.

FIG. 11 depicts a continuous backing film 104 comprising a plurality of flocked areas. The continuous backing film comprising a plurality of mold inserts would be formed by the process of FIG. 3. As will be appreciated, the release sheet and release adhesive are removed from the mold inserts in FIG. 3 but may be left in place for positioning in the mold.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

In one alternative embodiment, the mold insert is formed by direct flocking techniques. In that event, the mold insert does not include a release or carrier sheet.

In yet another embodiment, any number of molding techniques are employed. As will be appreciated, "molding" normally refers to creating a plastic or rubber article in a desired shape by application of heat and/or pressure, either in a negative cavity or in contact with a contoured metal or phenolic surface. Exemplary molding techniques that can be used with the present invention include but are not limited to high pressure injection molding, reaction injection molding, gas-assisted injection molding, fusible core injection molding, low pressure injection molding (including laminate molding and liquid-gas assist molding), advanced blow molding, blow molding, compression molding, thermoplastic sheet composite processing, reactive liquid composite molding, microcellular plastics, lamellar injection molding, and multimaterial, multiprocess technology, rotational molding, co-injection, in-mold decoration, encapsulation, stack molding, micro-injection molding, fusible core, vibration-assisted, injection molding extrusion, surface replication, direct compounding, vacuum forming, transfer molding, or any combination thereof. The finished plastic part need not be a flat plane, but by virtue of the flexibility of the flock transfer may be rounded, or portions of the part may be raised.

In another alternative embodiment, the conductive coating 1204 incorporates a conductive metal (either as an ion in a compound or as an element) that not only is electrically chargeable but also acts as an antimicrobial agent. An example of a suitable metal able to perform both functions is copper.

In other embodiments, the antimicrobial agent 1312 can be included in more than one location such as in the polymeric material, in the conductive coating, and on top of the conductive coating.

In yet another embodiment, the antimicrobial agent 1312 can be deposited at the interface between the polymeric material and the conductive coating.

In yet other embodiments, the conductive coating 1204 is omitted. The antimicrobial agent is included in the polymeric material and/or deposited on the exterior surface of the polymeric material.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   providing a flocked transfer sheet, a pre-formed, self-supporting, and thermosetting adhesive film, and a thermoplastic backing film;
   thereafter laminating the flocked transfer sheet, the thermosetting adhesive film, and the backing film together to form a mold insert; and
   forming the mold insert into a three-dimensional shape that substantially corresponds to a surface of at least a portion of a mold;
   positioning the formed mold insert in the mold;
   while the formed mold insert is positioned in the mold, introducing a resin into the mold to form a molded article comprising resin and the formed mold insert, wherein the
   thermosetting adhesive film is thermoset before the introducing step, wherein the formed mold insert retains the three-dimensional shape after the forming step and before positioning in the mold, and wherein a first orientation of the flock fibers before the introducing step is substantially the same as a second orientation of the flock fibers after the introducing step.

2. The method of claim 1, wherein a softening point of the backing film is less than a temperature of the resin when the resin is introduced into the mold, wherein the forming step follows the thereafter laminating step, wherein the three-dimensional shape of the mold insert is self-aligning and self-locating in the mold, and wherein the positioning step follows the forming step.

3. The method of claim 1, wherein a release sheet is affixed to a first surface defined by the flock fibers and the thermosettable adhesive layer to an opposing second surface defined by the flock fibers and wherein the three-dimensional shape of the backing film prevents dislodginent of the mold insert from a desired position in the mold during the introducing step.

4. The method of claim 3, wherein the laminating step comprises the substeps:
   heat applying the thermosetting adhesive to the flocked release sheet to form an intermediate transfer, wherein the thermosetting adhesive is in the thermoplastic state after the heat applying step;
   cutting the intermediate transfer into wanted and unwanted portions, the wanted portion having a final desired shape;
   removing the unwanted portions leaving the wanted portion of the intermediate transfer;
   laminating the wanted portion to the backing film to form the mold insert.

5. The method of claim 1, wherein the laminating step comprises the substeps:
   contacting the adhesive film with the backing film to form an intermediate assembly, the adhesive film, after the contacting step, being located only in a desired area of the backing film and having a final desired shape for the mold insert; and
   thereafter laminating the intermediate assembly to the flocked transfer sheet, wherein a first set of flock fibers on the flocked transfer sheet adhere to the adhesive film and a second set of flock fibers on the flocked transfer sheet do not adhere to the adhesive film.

6. The method of claim 1, wherein a continuous length of the flocked transfer sheet comprises a plurality of discrete flocked regions.

7. The method of claim 1, wherein the thermosettable adhesive layer and backing films are each a cast and/or extruded, continuous film.

8. The method of claim 1, wherein the thermosetting adhesive is distributed discontinuously over the adjoining surface of the flocked transfer sheet.

9. The method of claim 1, wherein, after the laminating step, a plurality of mold inserts are located on a continuous length of backing film and further comprising:
   cutting the backing film to provide a plurality of disconnected mold inserts.

10. The method of claim 9, wherein, after the cutting step, the mold insert comprises a flocked area surrounded at least substantially by an unflocked area of the backing film.

11. The method of claim 1, wherein the flocked transfer sheet comprises poly(cyclohexylene-dimethylene terephthalate) or PCT.

12. The method of claim 11, wherein the flocked transfer sheet comprises a plurality of flock fibers and the plurality of flock fibers comprise at least about 25 wt. % PCT.

13. The method of claim 1, wherein the flocked transfer sheet comprises a plurality of flock fibers and the lengths of at least most of the flock fibers ranges from about 0.3 to about 4 mm.

14. The method of claim 13, wherein a substrate of the flocked transfer sheet comprises at least about 60% fibers/in$^2$ and wherein at least most of the flock fibers have a titre ranging from about 0.5 to about 20 Dtex.

15. The method of claim 13, wherein at least most of the flock fibers have a denier of no more than about 2.

16. The method of claim 13, wherein an antimicrobial agent is located in at least most of the flock fibers.

17. The method of claim 13, wherein an antimicrobial agent is located on the exterior surfaces of at least most of the flock fibers.

18. The method of claim 1, wherein the backing film is not a textile.

19. The method of claim 1, wherein, during the laminating steps, the thermosettable adhesive is substantially fuly thermoset.

20. The method of claim 1, wherein, in the molded article, the adhesive film and backing film are positioned between the flock and the resin.

21. The method of claim 1, wherein the backing film is not a fabric.

22. The method of claim 1, wherein the backing film and the resin have different chemical compositions.

23. The method of claim 1, wherein the mold insert comprises a carrier sheet, flock fibers, and a release adhesive adhering the flock fibers to the carrier sheet, wherein the thermosetting adhesive film is positioned between the flock fibers and backing film, and wherein, in the introducing step, the carrier sheet is in direct contact with the mold surface.

24. A method, comprising:
forming a plurality of adhesive-containing areas and at least one area free of adhesive on a first surface of a backing film;
applying flock to the adhesive-containing areas of the backing film but not to the at least one area of the backing film that is free of adhesive, wherein, in the adhesive-containing areas, a thermosetting adhesive is positioned between the flock and backing film;
forming the backing film into a three-dimensional mold insert for placement in a mold;
positioning the formed mold insert in the mold;
while the formed mold insert is positioned in the mold, introducing a resin into the mold to form a molded article comprising resin and the mold insert, wherein the thermosetting adhesive film is substantially fully thermoset before the introducing step, wherein the formed mold insert retains the three-dimensional shape after the forming step and before positioning in the mold, and wherein a first orientation of the flock fibers before the introducing step is substantially the same as a second orientation of the flock fibers after the introducing step.

25. The method of claim 24, wherein a softening point of the backing film is less than a temperature of the resin when the resin is introduced into the mold and wherein the at least one area is free of flock after the applying step, whereby the first surface of the backing film is exposed for viewing.

26. A method, comprising:
(a) providing a flocked transfer sheet, a pre-formed, self-supporting, and thermosetting adhesive film, and a thermoplastic backing film;
(b) thereafter laminating the flocked transfer sheet, the thermosetting adhesive film, and the backing film together to form a mold insert, wherein the laminating step comprises the substeps:
(B1) heat applying the thermosetting adhesive to the flocked release sheet to form an intermediate transfer, wherein the thermosetting adhesive is in the thermoplastic state after the heat applying step;
(B2) cutting the intermediate transfer into wanted and unwanted portions, the wanted portion having a final desired shape;
(B3) removing the unwanted portions leaving the wanted portion of the intermediate transfer; and
(B4) laminating the wanted portion to the backing film to form the mold insert; and
(c) forming the mold insert into a three-dimensional shape that substantially corresponds to a surface of at least a portion of a mold;
(d) positioning the formed mold insert in the mold;
(e) while the formed mold insert is positioned in the mold, introducing a resin into the mold to form a molded article comprising resin and the formed mold insert, wherein the thermosetting adhesive film is thermoset before the introducing step (e), wherein a release sheet is affixed to a first surface defined by the flock fibers and the thermosettable adhesive layer to an opposing second surface defined by the flock fibers, and wherein the three-dimensional shape of the backing film prevents dislodgment of the mold insert from a desired position in the mold during the introducing step (e).

27. The method of claim 26, wherein a softening point of the backing film is less than a temperature of the resin when the resin is introduced into the mold, wherein the formed mold insert retains the three-dimensional shape after the forming step (c) and before positioning in the mold, and wherein a first orientation of the flock fibers before the introducing step (e) is substantially the same as a second orientation of the flock fibers after the introducing step (e).

* * * * *